(12) United States Patent
Galvin

(10) Patent No.: US 9,860,490 B2
(45) Date of Patent: Jan. 2, 2018

(54) NETWORK VIDEO RECORDER SYSTEM

(71) Applicant: Tom Galvin, Carrollton, TX (US)

(72) Inventor: Tom Galvin, Carrollton, TX (US)

( * ) Notice: Subject to any disclaimer, the term of this patent is extended or adjusted under 35 U.S.C. 154(b) by 497 days.

(21) Appl. No.: 14/494,201

(22) Filed: Sep. 23, 2014

(65) Prior Publication Data

US 2015/0103179 A1    Apr. 16, 2015

Related U.S. Application Data

(63) Continuation-in-part of application No. 13/200,785, filed on Sep. 30, 2011, now Pat. No. 8,922,658.

(60) Provisional application No. 61/456,434, filed on Nov. 5, 2010.

(51) Int. Cl.

| | |
|---|---|
| H04N 7/18 | (2006.01) |
| H04N 21/274 | (2011.01) |
| H04N 5/232 | (2006.01) |
| H04N 21/4143 | (2011.01) |
| H04N 21/472 | (2011.01) |
| H04N 21/2187 | (2011.01) |
| H04N 21/61 | (2011.01) |
| H04N 5/247 | (2006.01) |
| G08B 13/196 | (2006.01) |

(52) U.S. Cl.
CPC ......... *H04N 7/181* (2013.01); *H04N 5/23206* (2013.01); *H04N 5/247* (2013.01); *H04N 7/185* (2013.01); *H04N 21/2187* (2013.01); *H04N 21/274* (2013.01); *H04N 21/4143* (2013.01); *H04N 21/47202* (2013.01); *H04N 21/6125* (2013.01); *G08B 13/19656* (2013.01)

(58) Field of Classification Search
None
See application file for complete search history.

(56) References Cited

U.S. PATENT DOCUMENTS

| | | |
|---|---|---|
| 6,437,819 B1 | 8/2002 | Loveland |
| 7,205,891 B1 | 4/2007 | McGlothlin et al. |
| 7,543,327 B1 | 6/2009 | Kaplinsky |
| 7,634,662 B2 | 12/2009 | Monroe |

(Continued)

FOREIGN PATENT DOCUMENTS

| | | |
|---|---|---|
| WO | 2006130413 | 12/2006 |
| WO | 2009121053 | 10/2009 |

*Primary Examiner* — Frederick Bailey
(74) *Attorney, Agent, or Firm* — Schultz & Associates, P.C.

(57) ABSTRACT

An apparatus and method is presented for network video management and recording of video signals and video analytics generated by a network of IP-enabled cameras. A set of IP cameras are connected in a LAN to a network video recorder further connected by LAN or WAN to a set of client stations. The client station operates a hybrid program including a web-browser and a native application operating on a computer. The network video recorder operates a media recorder to store video streams from the IP cameras into a media database and further operates a relational database for storing camera configuration data, device drivers, event information and alarms. The network video recorder includes a zero configuration networking discovery service for automatically detecting and downloading default configurations to the cameras. Client stations can stream video directly from IP cameras, receive recorded video streams and query the relational database for cameras and events.

16 Claims, 23 Drawing Sheets

(56) References Cited

U.S. PATENT DOCUMENTS

| | | |
|---|---|---|
| 7,710,452 B1 | 5/2010 | Lindberg |
| 7,746,378 B2 | 6/2010 | Shue et al. |
| 7,855,729 B2 | 12/2010 | Onodera |
| 2002/0023092 A1 | 2/2002 | Tamura et al. |
| 2003/0081122 A1 | 5/2003 | Kirmuss |
| 2003/0117500 A1 | 6/2003 | Lin |
| 2005/0201592 A1 | 9/2005 | Peach et al. |
| 2006/0161960 A1* | 7/2006 | Benoit ............ G08B 13/19656 725/105 |
| 2007/0103543 A1 | 5/2007 | Anderson et al. |
| 2007/0226616 A1 | 9/2007 | Gagvani et al. |
| 2008/0199155 A1 | 8/2008 | Hagens et al. |
| 2009/0031381 A1* | 1/2009 | Cohen ............... H04L 29/08846 725/115 |
| 2009/0059962 A1 | 3/2009 | Schmidt et al. |
| 2009/0219387 A1 | 9/2009 | Marman et al. |
| 2009/0262206 A1 | 10/2009 | Park |
| 2010/0066835 A1 | 3/2010 | Colciago |
| 2010/0135643 A1 | 6/2010 | Fleming |
| 2010/0250497 A1 | 9/2010 | Redlich et al. |
| 2011/0001828 A1* | 1/2011 | Bigoloni .......... G08B 13/19645 348/159 |
| 2011/0040991 A1* | 2/2011 | Wu ........................ H04L 69/40 713/310 |
| 2011/0096167 A1 | 4/2011 | Pintado et al. |
| 2011/0149086 A1* | 6/2011 | Winbush, III ......... H04N 5/232 348/207.1 |
| 2011/0164111 A1 | 7/2011 | Karaoguz et al. |
| 2011/0292206 A1* | 12/2011 | Newton .............. H04L 12/4641 348/143 |
| 2012/0019671 A1 | 1/2012 | Goldberg et al. |
| 2012/0060053 A1* | 3/2012 | White ................ G06F 11/2025 714/6.3 |

\* cited by examiner

NETWORK VIDEO RECORDER SYSTEM

CROSS-REFERENCE TO RELATED APPLICATIONS

This application is a continuation-in-part of U.S. patent application Ser. No. 13/200,785 filed on Sep. 30, 2011, which claims priority benefit from U.S. Provisional Application No. 61/456,434 filed on Nov. 5, 2010. Each of the above identified patent applications is incorporated herein by reference in its entirety to provide continuity of disclosure.

FIELD OF THE INVENTION

This disclosure relates to the managing and recording of video and local events from a set of remote security devices over an internet protocol based network.

BACKGROUND OF THE INVENTION

Video security systems require large computer networks in order to respond to modern security requirements. Typically, hundreds of cameras and peripheral devices require installation and maintenance to produce satisfactory results. System maintenance requires substantial professional time to carry out. Further, system expansion and upgrade require considerable configuration and professional attention, for example, providing power to each device, connecting a data link from each device to local monitoring equipment, providing a communications link between a central security site and the local monitoring equipment within each building on a campus, assigning locations and ports to each device, and the manipulation and storage of video and other data streaming from the devices. All are currently labor intensive tasks which are prone to error and repetition.

Modern security networks benefit from the technology of Ethernet networks and IP routing. But, as the size of the network grows, manageability of the system often becomes an overwhelming task. For example, system maintenance requires an IT team to service the network, assign routers to subnetworks of security devices, set up the routers to route signals properly using combinations of DHCP and static routing assignments, and track of routing tables as the security network grows.

In some cases, large security systems have multiple campuses monitored at a single security site, necessitating use of the Internet. However, use of the Internet adds the issues of management of firewalls and other security considerations. The use of Ethernet, IP routing and the interest in security systems raises the need for automatic configuration.

Upgrade of a security system presents additional challenges. For example, no generally accepted standard for IP video systems exists. Each IP security camera and device typically requires a proprietary driver used for configuration and monitoring. Proprietary drivers require installation and constant update. The installation and upgrade process is therefore time consuming and unwieldy. The result is a need for a "plug and play" format for IP security devices to eliminate upgrade issues.

In many security systems, digital video recorders are employed to store video data from multiple cameras. Video data is typically stored in a database. Such databases soon become extremely large and unwieldy. Monitoring and maintenance of the database and elimination of unwanted data presents an additional challenge to the maintenance and upgrade of security systems.

Modern cameras used in security systems can perform many tasks internally. Examples are managing and controlling pan, tilt and zoom (PTZ) control, sensing I/O events, sensing audio events, providing a web interface on the camera for log in, controlling the camera parameters and event handling, and video analytics, such as motion detection. Examples are discussed in "AXIS and Intelligent Video (IV)" from Axis Communications, published 2009, incorporated by reference. However, to accomplish these tasks, configuration of the cameras must be done at installation. Further, greater capability of cameras results in more complex and time consuming installations.

U.S. Pat. No. 7,543,327 to Kaplinsky attempts to answer some of the issues in facing video security systems. For example, this patent discloses a video system including one or more high resolution network video cameras creating full field reduced resolution views and full resolution subwindow views. The video cameras are capable of simultaneously generating a full field of view reduced-resolution of an image and a full-resolution sub-window of the image. The computer is configured to receive images from the video cameras via a computer network and display the images on the monitor in which a full field view of the image and a sub-window of the image are displayed on the monitor simultaneously. Kaplinsky does not disclose or suggest "plug and play" camera detection or multiple automatic video services.

U.S. Patent Application Publication No. US2007/0226616 to Gagvani, et al, discloses a security system including a network with a plurality of sensors having network addresses, each generating sensing data. Software on the computer network communicates with the sensors and manages a display showing sensors in the system. A managing component communicates with the sensors by access through the associated network address on the network, and processes sensor information received from the sensors. The managing component has a display with an interface screen showing to a user all the sensors in the security system, and an input device through which the user can enter interactive instructions to the managing component. Gagvani et al does not disclose automatic detection of cameras or automatic configuration.

U.S. Patent Application Publication No. US2003/0117500 to Lin discloses a network video recording system which includes a video server controlling a video camera. A monitoring device connected to the video server which monitors the video image. The system includes at least one video server, at least one network storage device, and a monitoring device. The video server controls a video camera in order to obtain video image data by video recording, and sends the data via a network. The network storage device is connected to the video server with the network to receive the video image data sent by the same via the network and stores the video image data. The monitoring device is connected to the video server and the network storage device with the network for monitoring the video image data sent by the video server. The monitoring device may be used as a monitoring interface, or control the network storage device to send the video image data stored to the monitoring device for required inspection. However, Lin does not disclose automatic configuration or detection of video devices.

U.S. Patent Application No. US2008/0199155 to Hagens, et al, discloses a server-based software application which collects video images from cameras and sends them to a data collection device connected to a data center which stores the video images and transmits them on demand. Digital video recorders (DVRs) collect media (such as video with or without audio) and record it to a local disk. DVRs are located at sites where they are attached to cameras, microphones and point-of-sale (POS), or other data collection devices. A server-based application makes the data collected accessible to users. Viewers can then connect to the DVR and its corresponding media collection devices (such as cameras, microphones and POS devices) and control collection and use of media information directly. Hagens et al does not disclose "plug and play" camera applications or processing of event-driven camera actions.

U.S. Pat. No. 7,855,729 to Onodera discloses a video recording system which includes multiple cameras and video recorders. The monitor cameras are assigned to the video recorders in a manner such that each of the video recorders corresponds to at least one assigned monitor camera. Each of the monitor cameras sends its video signal to the assigned one of the video recorders. The video recorders record the video signals sent from the cameras. A failure detection system operates to locate failing of the video recorders. When detected, the assignment of the cameras to the video recorders changes so that the camera assigned to the failed video recorder is assigned to another video recorder. However, Onodera does not disclose "plug and play" camera detection, event-driven activities, or any monitoring of a video database.

SUMMARY

Disclosed is a network video recording system that automatically powers, detects, accepts, identifies, configures and records data from a series of video cameras connected to a computer network. The system provides an automated "plug and play" feature that automatically installs and configures video cameras. Manual installation of software drivers or networks of Ethernet switches is not required. The system responds to various network and camera conditions greatly reducing the amount of installation and maintenance time required to operate the system.

Accordingly, the system is comprised of a set of network cameras, a network video recorder, a PC workstation client running a client controller software enabled as an IP client station. The set of network cameras is connected to the network video recorder without the addition of an external Ethernet switch. The IP client station is connected to the network video recorder through an uplink port that may be reached via a standard TCP/IP network. The network video recorder is connected to the IP client station either locally over a power over Ethernet (PoE) connection or remotely through a network router via Wi-Fi. The system is capable of connecting multiple video recorders to a local IP client station or to remote IP client station.

The network video recorder is comprised of a microprocessor, memory, BIOS flash memory, Solid State Disk Drive, SATA Hard Disk Drive and multiple Power over Ethernet (PoE) (IEEE 802.3af, 802.3 at) enabled network interface ports. The number of network interface ports is preferably in configurations of 4, 8, 16 or 24 ports per recorder, the number of ports being limited only by the processing capability of the microprocessor and throughput of the memory, communications components, and Solid State Disk Drive.

In an alternate embodiment, the network video recorder may be adapted to embed a layer-2, Ethernet switch which then communicates with and coordinates signals to the network interface ports as wired RJ45 ports.

The network video recorder comprises Ethernet ports capable of accepting and recognizing cameras. The video recorder is comprised of a processor module, a heatsink and a carrier board. The processor module includes a microprocessor connected to memory. The processor module further comprises a system controller connected to a BIOS Flash. The carrier board includes at least one of group of multiple 10/100/1000 Base-T RJ-45 ports for the PoE connection, and multiple 10/100M Base-T RJ-45 ports. The carrier board further includes one 10/10/1000M RJ-45 port, one VGA (DB15) video monitor port, one E-SATA port and three USB 2.0 ports. Removable mass storage is operatively connected to the E-SATA port. Additionally, the carrier board includes an additional SATA port, an E-USB flash connector, a compact flash card socket, a system fan connector, and a power connector for a hard disk drive.

The network video recorder includes a control software, which when executed by the processor board, implements an automated "plug and play" mechanism, real-time video recording, video searches, video playback through a graphical user interface (GUI) and live video streaming from security devices.

The control software and operating system is stored on the solid state disk drive.

The video recorder supports all network cameras compliant with the ONVIF (Open Network Video Interface Forum) interoperability standard. The video recorder implements an automated "plug and play" capability for cameras connected through the PoE RJ-45 ports. Upon connection, all cameras are automatically powered, assigned an IP address, configured to a default video quality profile and recorded to hard-drive.

The automated "plug and play" capability requires no external network Ethernet switch or external power source. The automated "plug and play" capability is completely unattended, requiring no manual software, recorder or camera configuration steps or other user interaction.

The automated "plug and play" capability is implemented through control software instructions running on the processor module. The software provides an IP network discovery service for IP address assignment to the attached cameras. The software provides a library of software drivers to communicate and to provide configuration and video streaming instructions to the cameras attached to the RJ-45 ports. The software provides specific command and control instructions to the cameras for automated camera configuration. The automated camera configuration includes setting the features of video quality, video compression format, video frame-rate, time of day, motion detection configuration, motion sensitivity, and external I/O switching. In one embodiment, the IP network discovery service requests and downloads the library of camera software drivers from an internet server and configures the cameras using the software drivers.

The control software implements a video recording service to capture video streams from the RJ-45 ports. Video streams are stored on disk drives attached through an internal SATA connection, external SATA (eSATA) port or network attached storage (NAS) devices.

The control software implements a video streaming service to stream live and recorded video over RTP/TCP/IP to the IP client station via IP client controller software.

The control software supports an IP client controller software download, set up and initialization. The IP client controller software supports an automated client update service. Each time the client software is started from a remote PC, it will automatically check a web-based service to search, download and install software updates.

The control software in combination with the client software supports live viewing, PTZ control, camera tours and pre-defined camera views.

In use, the network video recorder receives instructions from the IP client station related to preferences of the user with respect to configuration of the network cameras. For example, camera choices, delay times, and PTZ parameters are selected through a graphic user interface produced by the client software operating on IP client station.

An IP network discovery service running on the network video recorder searches the network for available cameras connected at the RJ45 ports. Each Ethernet port controller associated to each RJ45 port reports specific connectivity data on a connected camera or other network security device including a fixed Mac-address which is stored in a SQL database. The network video recorder then configures each of the cameras, according to directions from the processor module, using camera specific data stored in the persistent memory (compact flash memory or mass storage device).

Once configured, the media recorder sets up streaming protocol channels to the cameras, and the event manager receives event and alarm data from the cameras including video streams and event transactions, according to instructions from the scheduler. Subsequently, video streams are stored in the media database and event/alarm transactions are stored in the SQL database via the mass storage device on the SATA port.

DETAILED DESCRIPTION

The following disclosure describes only preferred embodiments. The specific preferred embodiments disclosed are not intended to be limiting.

Figure 1:
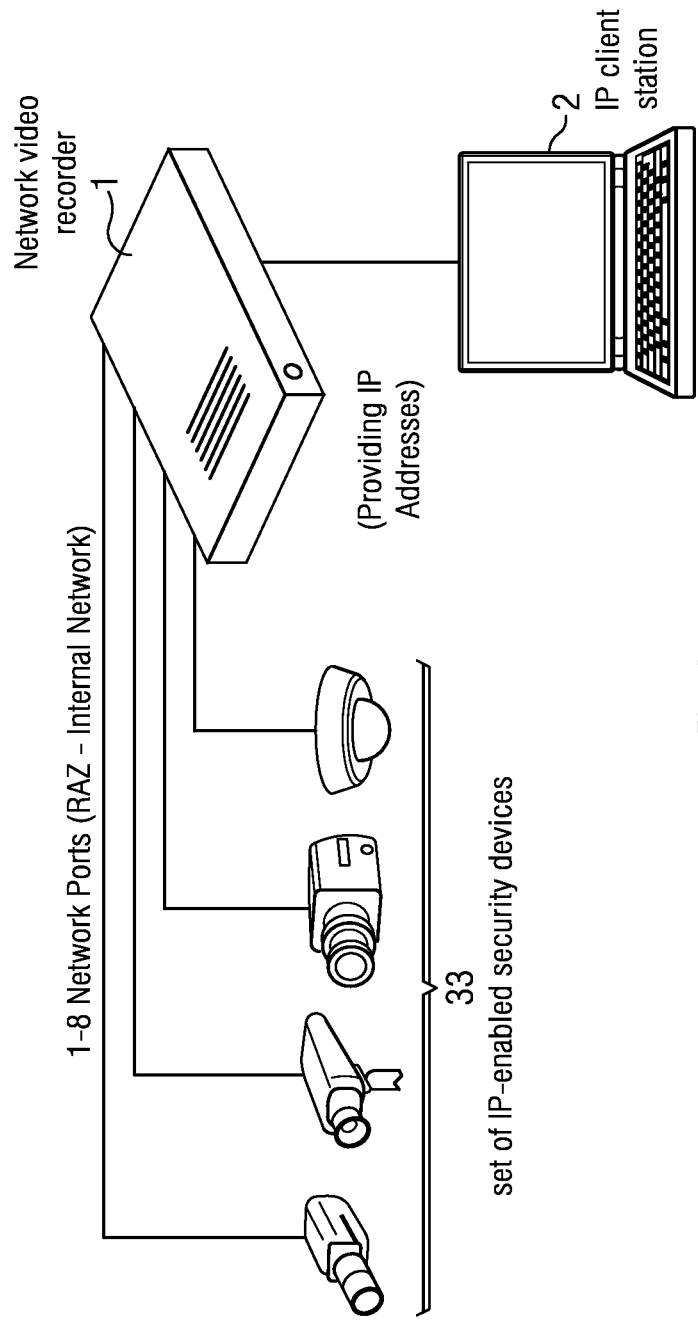
FIG. 1 is a diagram showing a LAN-based network of security devices managed by a preferred embodiment network video recorder and IP client system.

In FIG. 1, a network video recorder system is shown comprising a network video recorder 1 and an IP client station 2. The network video recorder 1 is attached to a set of IP-enabled security devices 33, preferably by power over Ethernet (PoE) wired cables. The IP client station 2 is attached to network video recorder 1. The system configuration enables a LAN based network video system.

Alternatively, network video recorder 1 is attached to set of IP-enabled security devices 33 via a wireless link such as one of the Wi-Fi standards.

IP client station 2 is preferably a PC workstation such as a laptop computer which supports a Microsoft Windows operating system. IP client station 2 which supports a software application downloaded from the network video recorder.

Figure 2:
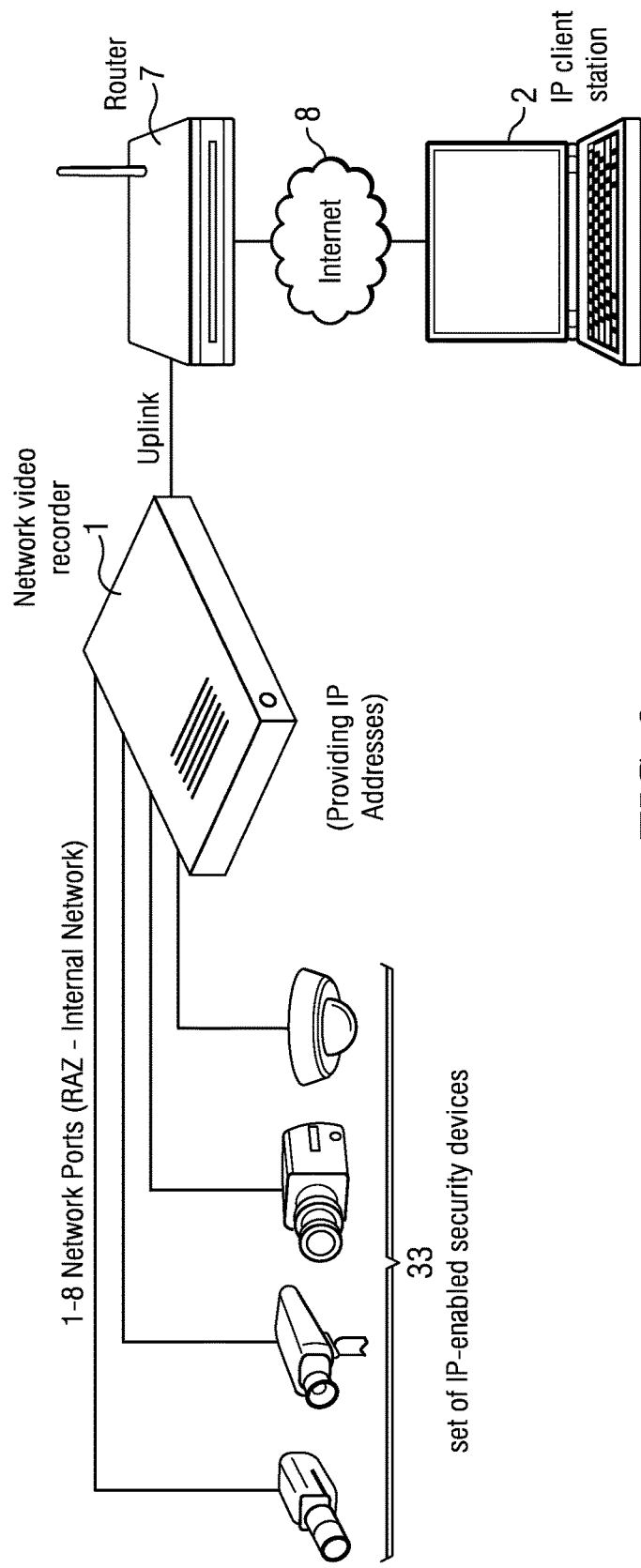
FIG. 2 is a diagram showing a LAN-based network including a preferred embodiment network video recorder managed remotely by an IP client system.

In FIG. 2, a network video recorder system is shown comprising a network video recorder 1, a router 7 and an IP client station 2 connected to the router via a wide area network, internet 8. The network video recorder 1 is connected to router 7 through an uplink port. A set of IP-enabled security devices 33 are connected to network video recorder 1, preferably by power over Ethernet (PoE) wired cables. The IP client station 2 is attached to network video recorder 1 via internet 8 and router 7. The system configuration enables a hybrid LAN and WAN based network video system.

Alternatively, network video recorder 1 is attached to set of IP-enabled security devices 33 via a wireless link such as one of the Wi-Fi standards.

IP client station 2 is preferably a PC workstation such as a laptop computer running Microsoft Windows operating system. IP client station 2 is operating a client software downloadable from the network video recorder.

Figure 3:
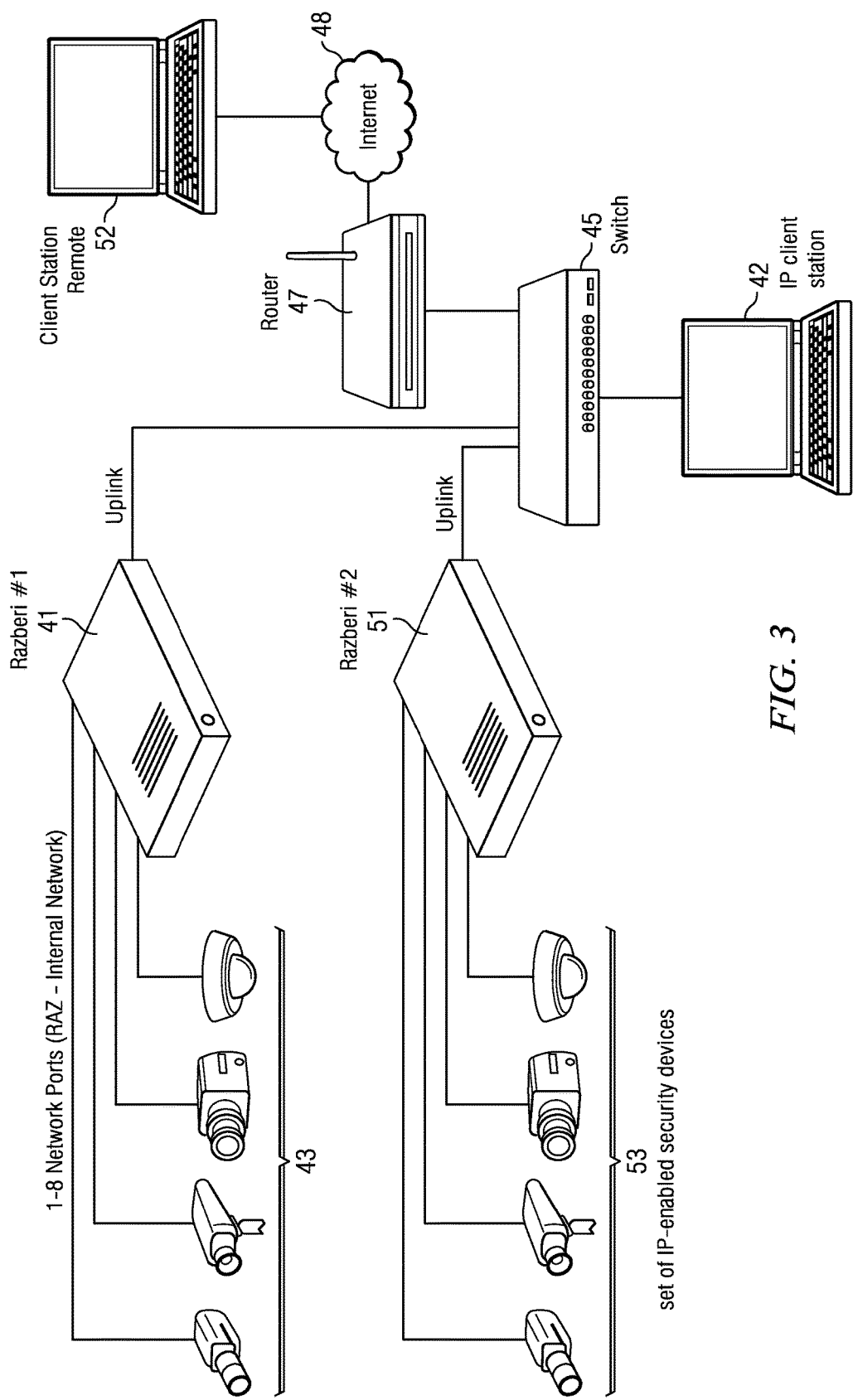
FIG. 3 is a diagram showing a plurality of LAN-based networks including a plurality of preferred embodiment network video recorders managed locally and remotely by a plurality of IP client systems.

The system configuration shown in FIG. 3 enables a hybrid LAN and WAN based network video system capable of managing a plurality of network security devices with a plurality of IP client stations. In FIG. 3, a network video recorder system is shown comprising a first network video recorder 41 connected to a set of IP-enabled security devices 43, preferably by power over Ethernet (PoE) wired cables such as CAT5 or CAT6. The network video recorder system further comprises second network video recorder 51 connected to a set of IP-enabled security devices 53, preferably by PoE wired cables. The IP-enabled security devices 43 and 53 are connected directly to the network video recorders 41 and 51, respectively, and do not require external power sources, Ethernet hubs, or Ethernet switches. First network video recorder 41 and second network video recorder 51 are connected to Ethernet switch 45. IP client station 42 is connected to Ethernet switch 45. IP client station 42 is also in communication with network video recorder 41 and network video recorder 51 via Ethernet switch 45.

The network video recorder system further comprises a router 47 connected to Ethernet switch 45 and to internet 48, and an IP client station 52 in communication with network video recorder 41 and network video recorder 51 through internet 48, router 47 and Ethernet switch 45.

Alternatively, one or both of network video recorder 1 and network video recorder 2 are attached to their associated sets of IP-enabled security devices via a wireless link such as one of the Wi-Fi standards.

IP client stations 42 and 52 are preferably PC workstations such as a laptop computer running Microsoft Windows operating system. IP client station 42 and 52 are operating a client software downloadable from the network video recorder.

Figure 4:
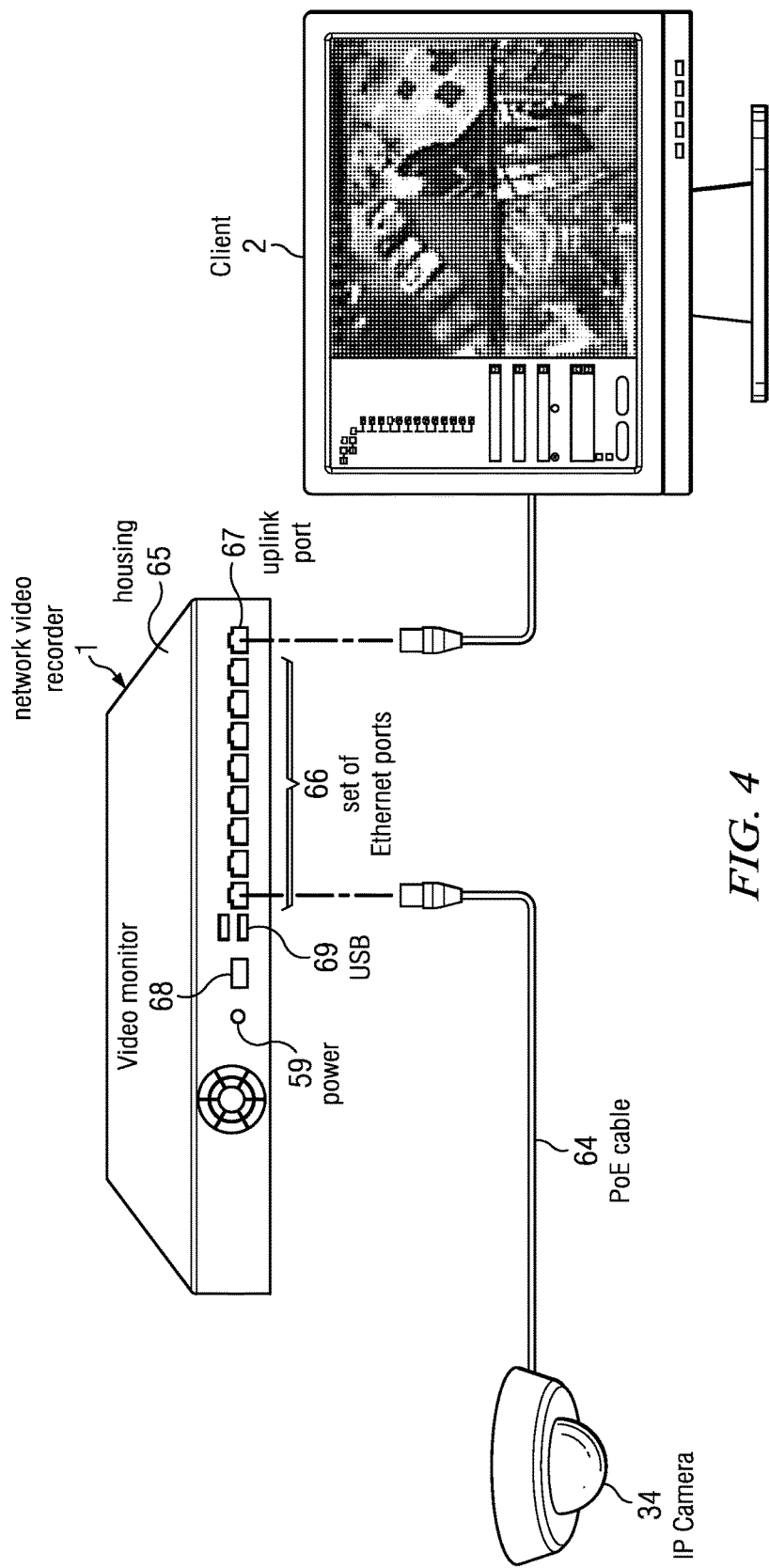
FIG. 4 is a graphic view of a rear connection panel of a network video recorder according to the preferred embodiments, showing the connectivity to a security device and an IP client system.

FIG. 4 is a back graphic view of exemplary housing 65 of network video recorder 1, further showing various connections and ports made available on back panel 58. The various connections of network video recorder 1 are a power connection 59 for providing DC power, a video monitor port 68 for connecting a video display, a set of USB ports 69 for connecting external devices such as temporary storage drives, an uplink port 67 to provide an Ethernet connection to IP client station 2, and a set of Ethernet ports 66. An IP camera 34, for example, is connected to network video recorder 1 by PoE cable 64 plugged into one of the set of Ethernet ports. IP camera 34 derives its power from network video recorder 1 via the PoE cable, needing no further external power connection at its remote location, enabling the placement of IP cameras in locations where power is normally not available. IP camera 34 requires no external power sources, Ethernet hubs, or Ethernet switches to enable its connection to the network video recorder 1.

Figure 5:
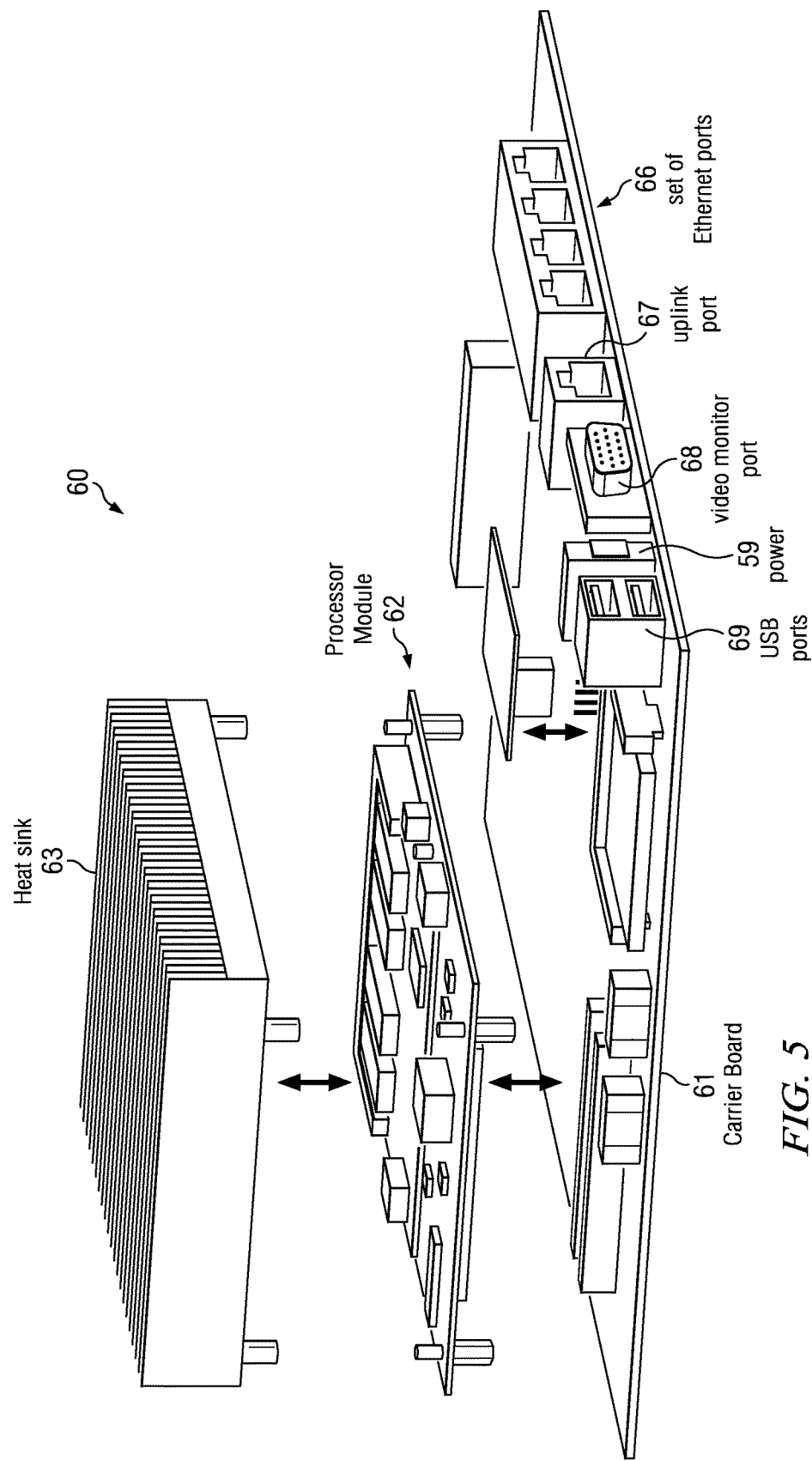
FIG. 5 is a diagram of the hardware components of a network video recorder.

In addition to the housing and back panel with the various connections, the network video recorder comprises a set of hardware components shown in FIG. 5. The set of hardware components 60 include a carrier module 61 attached to a processor module 62. A heat sink 63 is attached to processor module 62 to remove heat from the components of the processor module by conduction and forced air convection.

Figure 6:
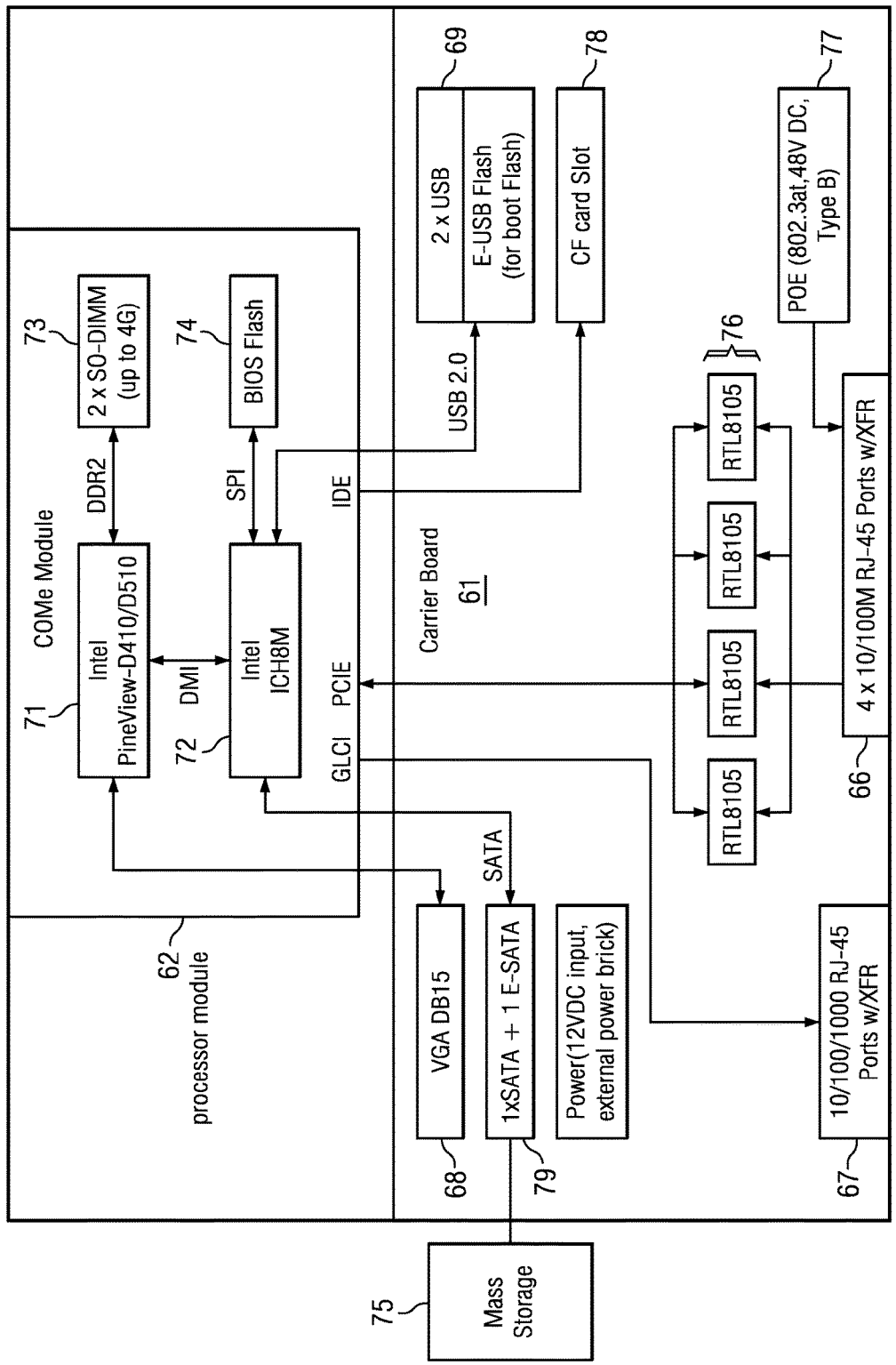
FIG. 6 is a block diagram of a first exemplary embodiment of the network video recorder enabling four ports of power over Ethernet connectivity to security devices.

FIG. 6 is a block diagram of a first exemplary hardware configuration within the preferred embodiments of the present invention, including the configuration of processor board 62 and carrier board 61.

Processor module 62 is comprised of microprocessor 71 connected to memory 73, and system controller 72 connected to the microprocessor and BIOS Flash memory 74. System controller 72 is further connected to devices and ports contained on carrier module 61, in part by a PCI express interface, a SATA interface and USB interface and a GLCI interface for Ethernet connectivity.

Examples of a suitable component for microprocessor 71 are the Intel D410, Intel D510, and Ivy Bridge processors from Intel Corporation. Memory 73 is preferably a 2×SO-DIMMS (dual incline memory module) of up to sixteen gigabytes capacity. A system controller compatible with the Intel D410 is the Intel ICH8M. The BIOS Flash contains a compatible BIOS to operate the chosen microprocessor and system controller, such as the AMI UEFI BIOS. An example of a suitable component with suitable configurations for processor module 62 is the COMx 430 or COMx 440 modules from Emerson Network Power.

Carrier board 61 includes four 10/100/1000 Base-T RJ45 ports for the set of Ethernet ports 66 controlled by a set of fast Ethernet controllers 76 which are connected to and driven by the system controller 72. PoE source 77 provides power to enable PoE to the set of Ethernet ports 66. Carrier board 61 further includes an additional 10/10/1000M RJ-45 port 67 driven directly by system controller 72. A video port monitor port 68 is driven by microprocessor 71. SATA and E-SATA ports 79 driven by system controller 72 are further connected to internal removable mass storage 75 which is preferably a 2.5 or 3.5 inch HDD or Solid State Disk (SSD). USB ports 69 provide USB 2.0 signals to the back panel from the system controller via a 2×1 stack USB connector and to an internal E-USB flash port. Additionally, the carrier board includes one compact flash card socket 78 suitable for connecting compact flash memory to system controller 72, and power connectors for the 3.5 inch HDD and a cooling fan (not shown).

The modularity between carrier board 61 and processor module 62 allows for a wide variety of different component configurations, processing powers, number and type external communication ports, and video throughput. In FIGS. 6-9, various hardware options are shown, each of which requires a suitably powerful processor, or suitably powerful Ethernet switching capacity to accomplish a desired feature set.

Figure 7:
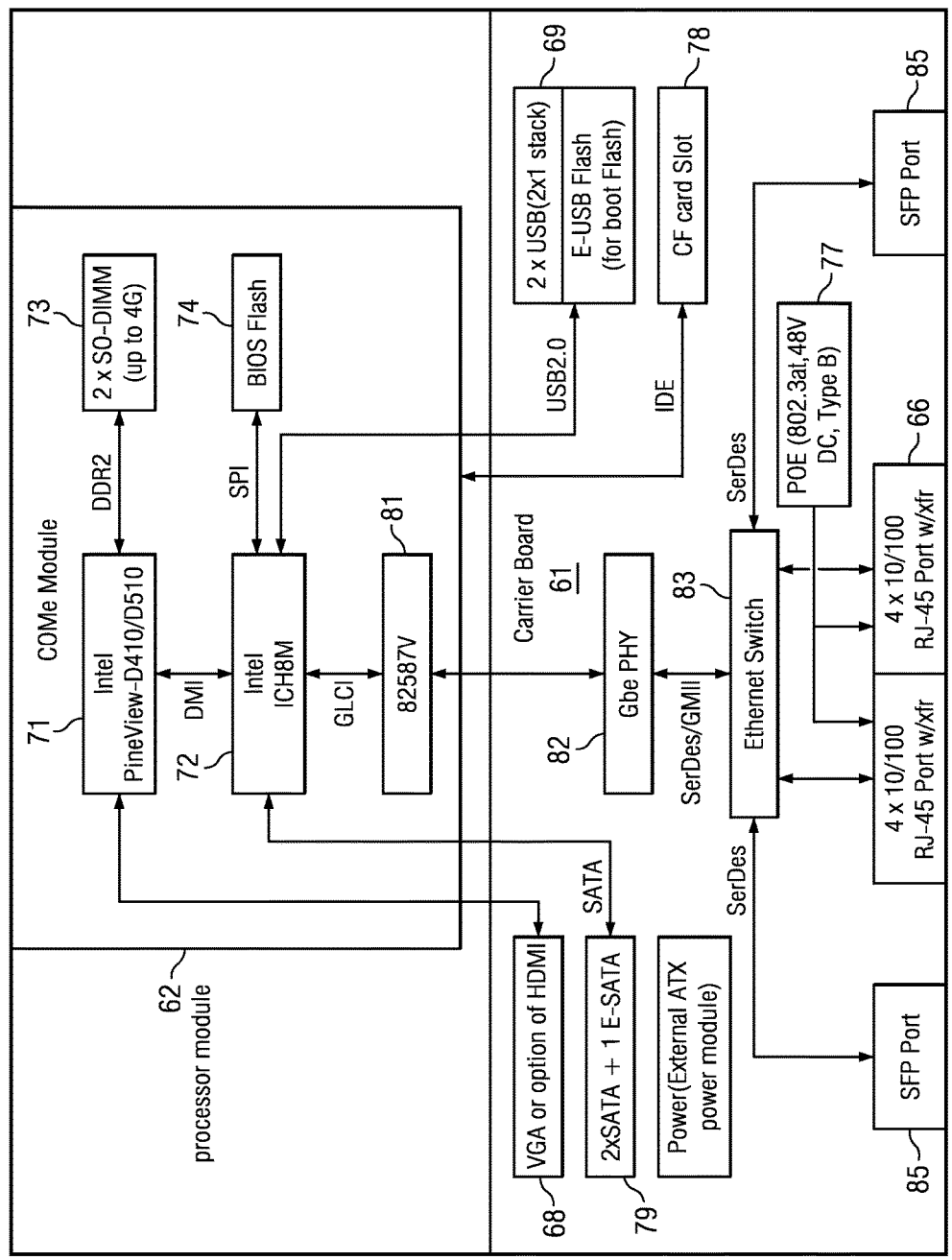
FIG. 7 is a block diagram of a second exemplary embodiment of the network video recorder enabling eight ports of power over Ethernet connectivity to security devices.

FIG. 7 is a block diagram of a second exemplary hardware configuration within the preferred embodiments of the present invention, including the configuration of processor board 62 and carrier board 61.

Processor module 62 is comprised of a microprocessor 71 connected to a memory 73, and a system controller 72 connected to the microprocessor, to a Gigabit Ethernet controller 81, and to a BIOS Flash memory 74. The system controller 72 is further connected to devices and ports contained on carrier module 61, in part by a PCI express interface, a SATA interface and USB interface. A suitable component for the Gigabit Ethernet controller is the Intel 82567 from Intel Corporation.

Carrier board 61 of the second exemplary embodiment includes eight 10/100/1000 Base-T RJ45 ports for the set of Ethernet ports 66 connected to a layer-2 Ethernet switch 83. A GbE PHY interface 82 connects GbE signals between Gigabit Ethernet controller 81 and Ethernet switch 83. Two small form pluggable optical Gigabit Ethernet ports, SFP ports 85, are provided to connect Ethernet switch to the back panel. PoE source 77 provides power to enable PoE to the set of Ethernet ports 66. A video port monitor port 68 is driven by microprocessor 71. SATA and E-SATA ports 79 driven by system controller 72 are further connected to an internal removable mass storage which is preferably a 3.5 inch HDD or SSD. USB ports 69 provide USB 2.0 signals from the system controller to the back panel via a 2×1 stack USB connector and to an internal E-USB flash port. Additionally, the carrier board includes one compact flash card socket 78 suitable for connecting compact flash memory to system controller 72, and power connectors for the 3.5 inch HDD and a cooling fan (not shown).

Figure 8:
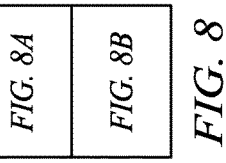
FIG. 8A is a portion of a block diagram of a third exemplary embodiment of the network video recorder enabling sixteen ports of power over Ethernet connectivity to security devices.
FIG. 8B is a portion of a block diagram of a third exemplary embodiment of the network video recorder enabling sixteen ports of power over Ethernet connectivity to security devices.
Figure 8A:
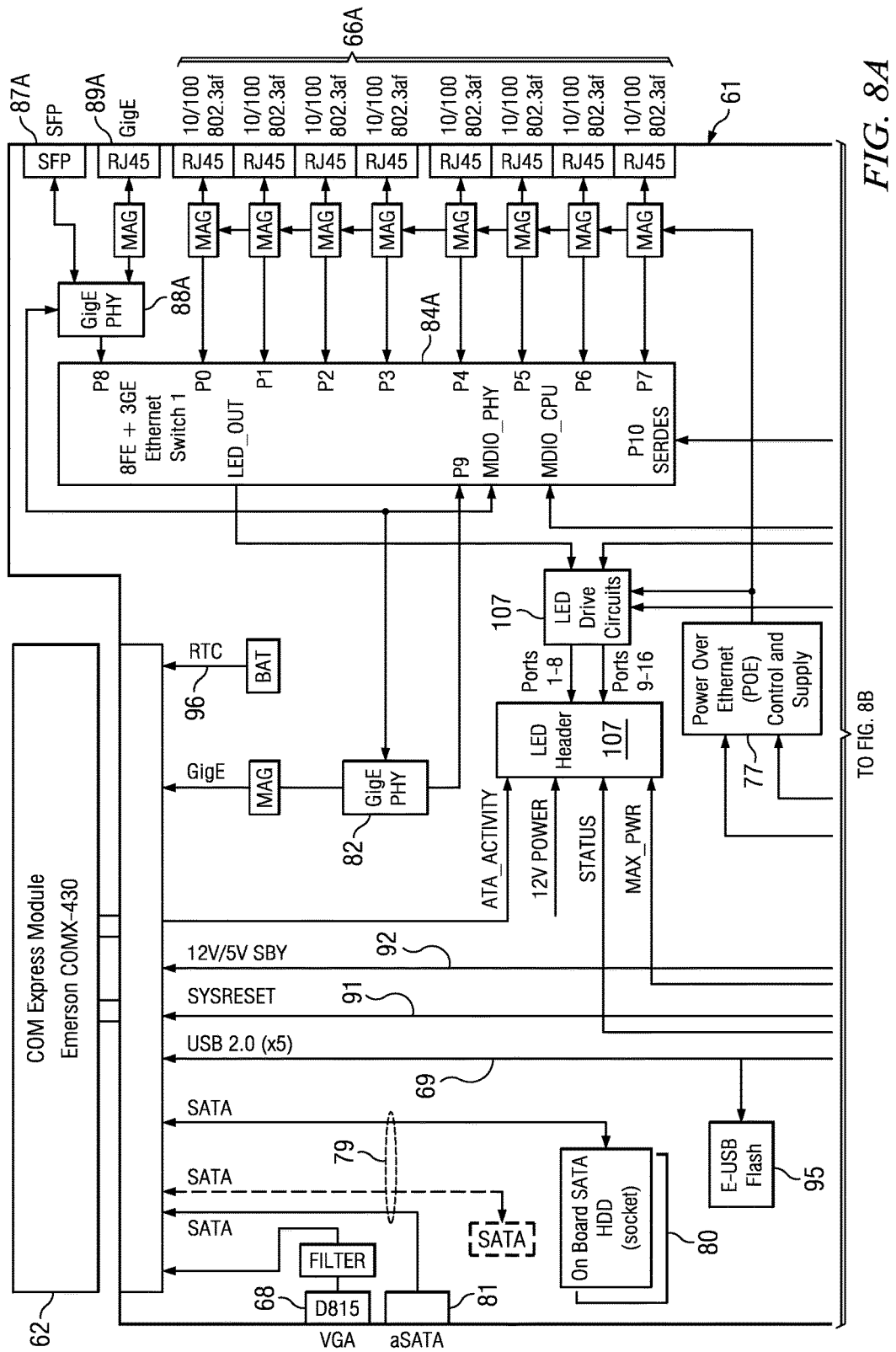
Figure 8B:
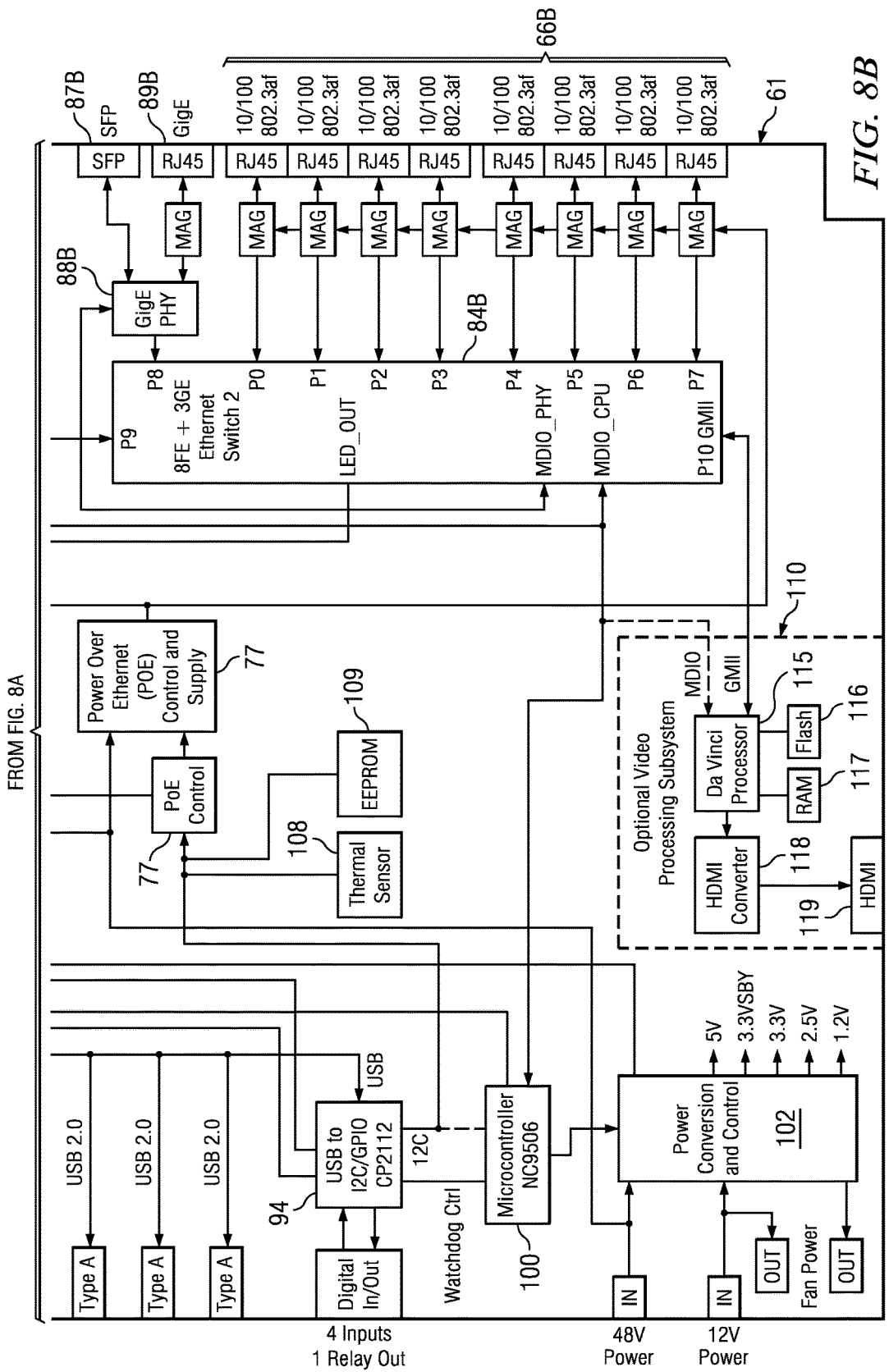

FIGS. 8A and 8B show a block diagram of a third exemplary hardware configuration within the preferred embodiments of the present invention, including the configuration of carrier board 61.

Processor module 62 is the same as the processor module of the first and second embodiments, explicitly having a set of ports connected to carrier board 61.

Carrier board 61 of the third exemplary embodiment includes sixteen (16) 10/100 Base-T RJ45 ports equipped with MAG jacks and organized into a first set of Ethernet ports 66A which are connected to a first Ethernet switch 84A and a second set of Ethernet ports 66B which are connected to a second Ethernet switch 84B.

In another embodiment, carrier board 61 includes up to twenty-four (24) 10/100 Base-T RJ45 ports equipped with MAG jacks.

First Ethernet switch 84A and second Ethernet switch 84B are connected to one another via a serial interface. First Ethernet switch 84A is further connected via a GigE Phy interface 88A to a small form pluggable optical Gigabit Ethernet port, SFP port 87A and a 1000 Base-T RJ45 port 89A equipped with a MAG jack. Second Ethernet switch 84B is further connected via a GigE Phy interface 88B to a small form pluggable optical Gigabit Ethernet port, SFP port 87B and a 1000 Base-T RJ45 port 89B equipped with a MAG jack. A GbE PHY interface 82 connects GbE signals between Gigabit processor board 62 and first Ethernet switch 84A. PoE control and supply 77 provides power to enable PoE to the sets of Ethernet ports 66A and 66*b* via their MAG jacks.

A video monitor port 68 is passed through carrier board 61 from processor board 62. Set of SATA and E-SATA ports 79 driven by processor board 61 are further connected to an external SATA port 81 and to an on-board removable mass storage 80 which is preferably a 2.5 or 3.5 inch HDD or SSD (Solid State Disk). External SATA port 81 can be connected to external mass storage devices to provide for portable storage devices. USB ports 69 provide USB 2.0 signals from the processor board 61 to the back panel via a set of type A USB connectors and to an internal E-USB flash device 95. Additionally, carrier board 61 includes a microcontroller 100 for configuring the Ethernet switches, configuring PoE control and supply 77, communicating with an EEPROM 109 and communicating with a thermal sensor 108 to control a cooling fan. Microprocessor 100 also controls the general power supply staging for the processor board and the carrier board via power conversion and control system 102. A USB-to-I2C converter circuit 94 connects the processor board 61 to microcontroller 100 via set of USB ports 69, to a set of LEDs and LED drive circuits 107, to thermal sensor 108, EEPROM 109 and PoE control and supply 77.

Carrier board 61 of the third exemplary embodiment also includes a high definition video subsystem 110 comprised of a digital signal processor 115, and HDMI converter 118 connected to the digital signal processor for converter digital video signals to HDMI format suitable for connection to an HDMI device via HDMI port 119. High definition video subsystem 110 includes flash memory 116 for storing and retrieving processor instructions for digital signal processor 115. RAM memory 116 is attached to digital signal processor 115 for storing video data.

Figure 9:
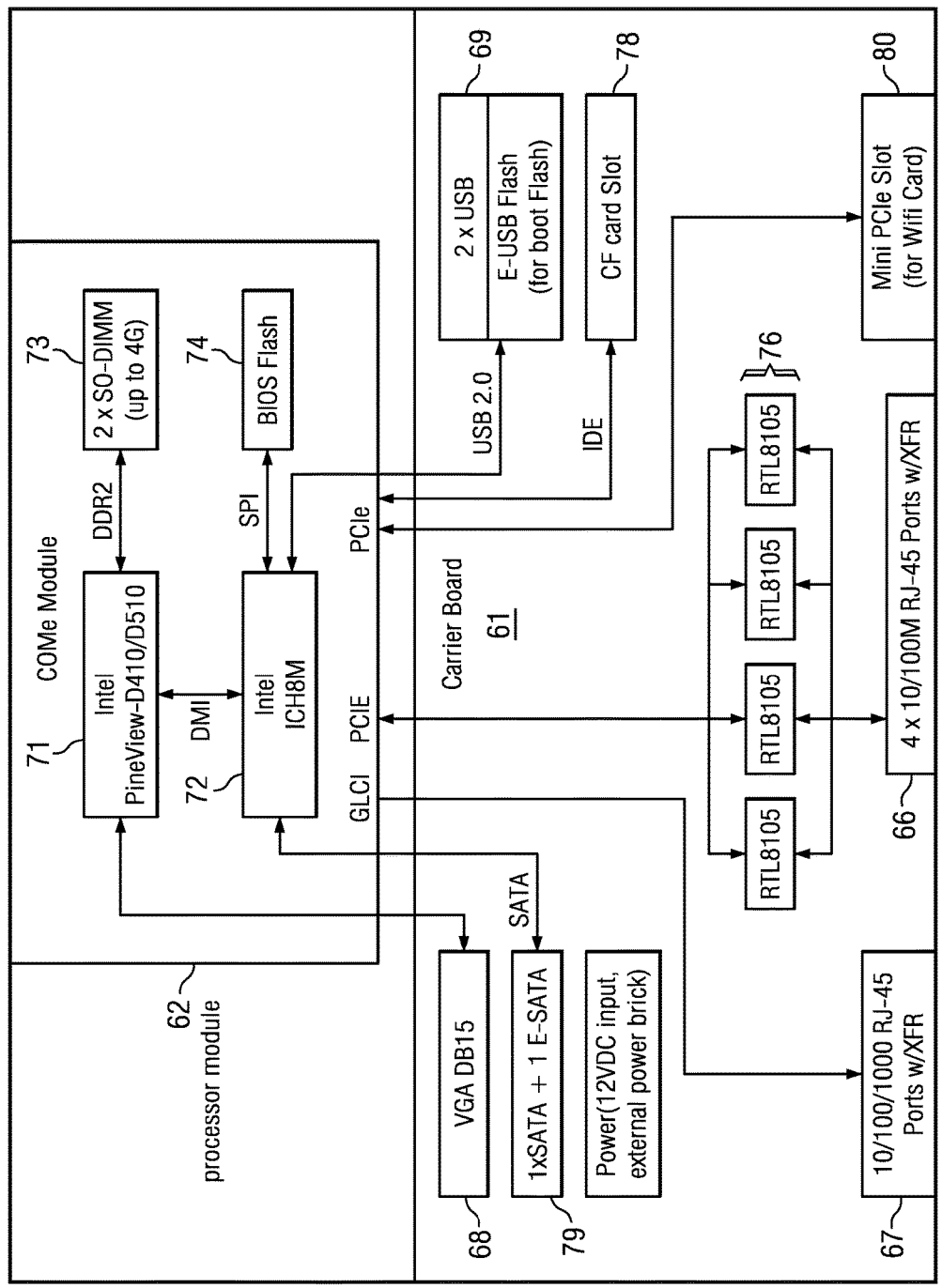
FIG. 9 is a block diagram of a fourth exemplary embodiment of the network video recorder enabling wired and wireless Ethernet connectivity to security devices.

FIG. 9 is a block diagram of a fourth exemplary hardware configuration within the preferred embodiments of the present invention, including the configuration of processor board 62 and carrier board 61.

Processor module 62 is comprised of a microprocessor 71 connected to a memory 73, and a system controller 72 connected to the microprocessor and a BIOS Flash memory 74. The system controller 72 is further connected to devices and ports contained on carrier module 61, in part by a PCI express interface, a SATA interface and USB interface and a GLCI interface for Ethernet connectivity.

In FIG. 9, carrier board 61 includes four 10/100/1000 Base-T RJ45 ports for the set of Ethernet ports 66 controlled by a set of fast Ethernet controllers 76 which are connected to and driven by the system controller 72. PoE source 77 provides power to enable PoE to the set of Ethernet ports 66. Carrier board 61 includes an additional 10/10/1000M RJ-45 uplink port 67 driven directly by system controller 72. Wireless communications is enabled to carrier board 61 by a wireless mini PCIe card plugged into a mini-PCIe slot 80 provided on carrier board 61 and driven by the PCI express interface of system controller 72. A video port monitor port 68 is driven by microprocessor 71. SATA and E-SATA ports 79 driven by system controller 72 are further connected to internal removable mass storage 75 which is preferably a 2.5 or 3.5 inch HDD or SSD. USB ports 69 provide USB 2.0 signals from the system controller to the back panel via a 2×1 stack USB connector and to an internal E-USB flash port. Additionally, the carrier board includes one compact flash card socket 78 suitable for connecting compact flash memory to system controller 72, and power connectors for the 2.5 inch HDD and a cooling fan (not shown).

Figure 10:
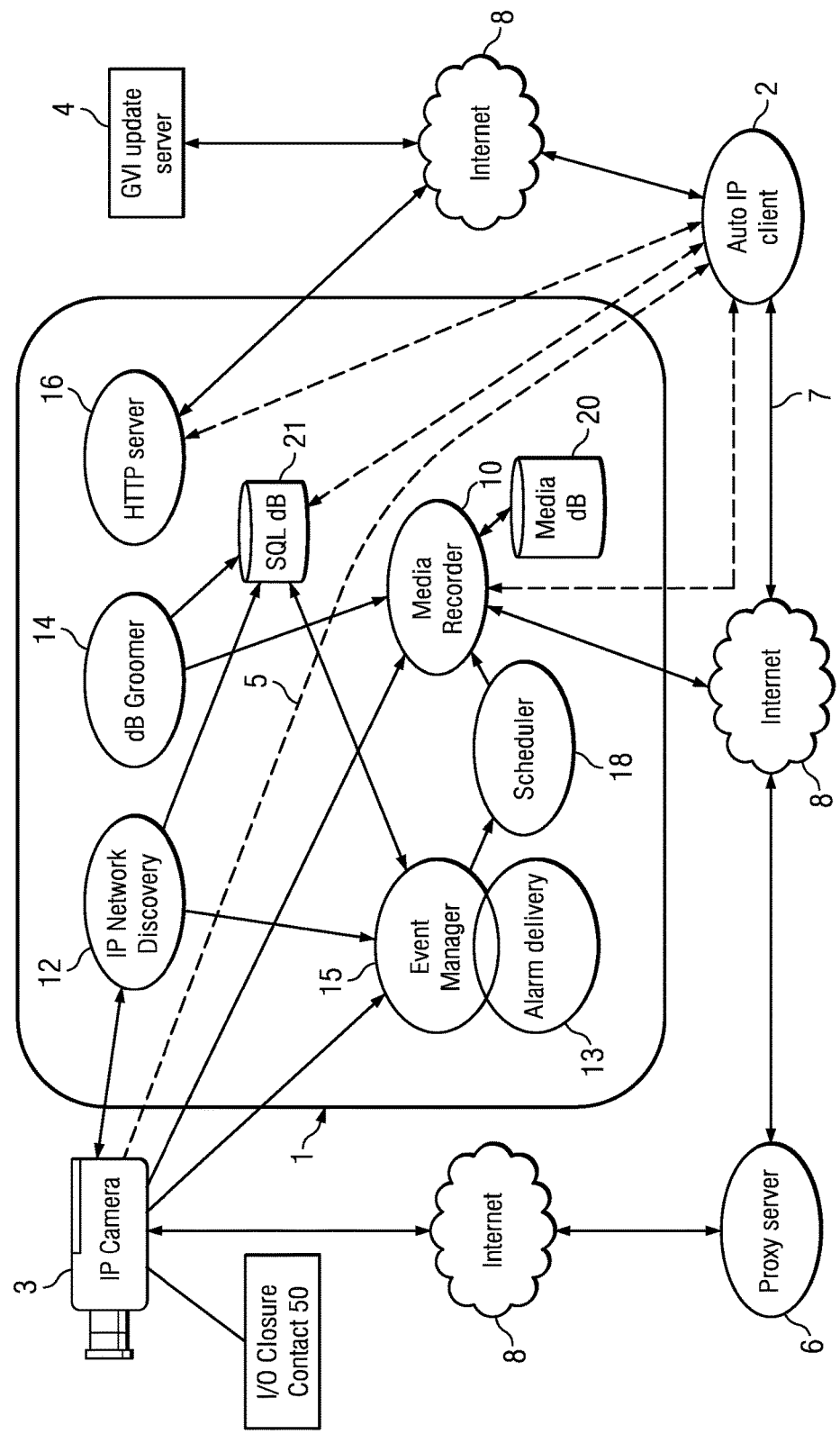
FIG. 10 is a functional block diagram of the system functionality of a preferred embodiment network video recorder system including IP-enabled cameras.

In use, the processor module of the network video recorder instantiates and executes a number of software modules as instructions stored in compact flash memory or in the external mass storage. FIG. 10 is a block diagram showing the function of the network video recorder system and indicating data flow and communication between the software modules involved.

In FIG. 10, the network video recorder system includes the network video recorder 1 in communications with an IP client station 2, at least one IP camera 3, and GVI update server 4. Network video recorder 1 communicates with IP client station 2 and GVI update server 4 through a LAN or through the internet 8 as required. IP client station 2 can communicate to IP camera 3 on a LAN using the network video recorder to enable RTSP streaming directly from IP camera 3 to IP client station 2 on LAN based connection 5. IP client station 2 can communicate to IP camera 3 on a WAN using a proxy server 6 to set up an internet based connection 7 through internet 8. IP client station 2 is in communication with GVI update server 4 via the internet to receive automatic updates of client software and network security device drivers for the network video recorder. Network video recorder 1 is in communication with GVI update server 4 via the internet to request and receive network security device drivers for the network video recorder and for IP camera 3.

IP camera 3 is configured with video analytics and IP communication protocol according to the open network video interface forum (ONVIF) standard or proprietary standards from supported manufacturers and is preferably connected to network video recorder 1 with a wired PoE link.

Network video recorder 1 includes a number of automated services instantiated and executed by the processor module to operate based on the occurrence of security device events, a pre-determined schedule, and network-based events. A control software module coordinates the automated services and communications there between.

Network video recorder 1 includes an IP network discovery service 12, a program that when executed by the processor module, functions to sense the presence of IP camera 3 and all other IP-enabled security devices attached via Ethernet to the network video recorder. IP network discovery service 12 enables automatic discovery of computers, devices, and services on IP networks using industry standard IP protocols to allow devices to automatically discover each other without the need to enter IP addresses or configure DNS servers. Specifically, IP network discovery service 12 enables automatic IP address assignment without an external DHCP server, name to address translation without a DNS server, and service discovery without a directory server. A suitable plug-in module for IP network discovery service 12 implements zero configuration networking. An example of such an implementation is the "Bonjour Open" protocol from Apple, Inc. which has been submitted to the IETF as part of the ongoing standards-creation process.

Network video recorder 1 includes HTTP server 16 operated by the processor module for serving http web pages to IP client station 2 and enabled to allow IP client station 2 to download client software and to configure the services of network video recorder 1. HTTP server 16 can serve web pages directly through a LAN or over a WAN via internet 8. Network video recorder 1 includes two databases: a media database 20 and a SQL database 21 which are electronically stored on the mass storage device or the compact flash drive. Media database 20 is preferably a flat file database for storing and accessing recorded video files. SQL database 21 is preferably a relational database containing data pertaining to IP security devices, events, and metadata associated to recorded video files. Typical data stored in SQL database 21 includes security device data comprising MAC address, name, manufacturer, IP address, model, default configuration, device drivers and events associated to the security device.

IP network discovery service 12 is programmed to automatically configure IP camera 3 once it is detected in the network, from a default configuration stored in SQL database 21. The default configuration for an IP camera device includes time stamp synchronization to network video recorder 1, choice of compression algorithm (e.g. H.264), image quality, image size, frame rate, PTZ parameters, enabling/disabling of motion detection, and enabling/disabling event detection based on I/O contact closure events, motion detection events and audio events. IP network discovery service is further programmed to store IP addresses and MAC addresses of IP-enabled security devices including IP camera 3 in SQL database 21 upon discovery.

IP camera 3 is also connected to I/O contact closure 50. I/O contact closure is an analog port which can be accessed to indicate contacts of magnetic closures (such as door contacts), fire alarms, manual (panic) buttons or other manual inputs such as card key reader authorization, or security tour confirmation checkpoints. Data related to the event including data characterizing the type of event and reaction to be taken is stored in the SQL database upon camera discovery and setup.

Network video recorder includes a database groomer 14 which is a service that is instantiated and executed by the processor module. Database groomer 14 is programmed to become active periodically in order to perform "clean-up" functions on media database 20 and SQL database 21. The clean-up functions include eliminating old events from SQL database 21 and old recorded video files from media database 20. The clean-up is preferably performed on a first-in-first-out basis. IP client station 2 is capable of being configured to periodically or manually download recorded video files for archival storage for example on a local hard drive, R/W DVD disc drive, and USB flash drive.

Database groomer 14 is further configured to create XML metadata files for events and for recorded video files, and to attach those XML metadata files to the events and recorded video files in SQL database 21 and media database 20, respectively.

Network video recorder 1 includes event manager 15. Event manager 15 monitors events recorded from each IP camera and coordinates actions of the system to correspond to the event. For example, when a camera detects motion, an event notification is sent via TCP/IP to the Event Manager. In another example, when a camera detects a tampering event, such as blocking the view of the camera, smashing the camera, or breaking the lens of the camera off, an event notification is sent via TCP/IP to the Event Manager. The Event Manager processes the event according to configurable user instructions. Motion events trigger video recording by default.

A table showing a list of events and corresponding actions appears below:

TABLE 1

| Event | Action |
| --- | --- |
| I/O contact closure | Video recording, Alarm notification on a user interface, alarm notification via messaging (SMS, email, smart phone push) |
| Motion detection | Video recording, Alarm notification on a user interface, alarm notification via messaging (SMS, email, smart phone push) |
| Audio detection | Video recording, Alarm notification on a user interface, alarm notification via messaging, (SMS, email, smart phone push) |
| Video Loss | Reset camera via TCP/IP command, reboot camera by toggling PoE power to camera |
| Tamper detection | Video recording, still image capture, Alarm notification on a user interface, alarm notification via messaging (SMS, email, smart phone push) |

Event manager 15 also functions to capture events as they are logged by IP camera 3 and to store events in SQL database 21, and schedule recorded video files with scheduler 18 based on the occurrence of an event. Scheduler 18 functions to receive events from event manager, time stamp the event and initiate media recording based on interactions with event manager 15. Scheduler 18 is further programmed to periodically perform actions, such as video recordings from specific sets of cameras at pre-determined times. Scheduler 18 further functions to schedule video session recordings based on an event priority level, available throughput and available storage. Scheduler 18 further functions to look up the IP address of an IP security device and forward the IP address to media recorder 10.

Attached to event manager 15 is alarm delivery service 13. Alarm delivery service 13 functions to create alarm events based on event thresholds, associate alarms to actors, and to deliver a communication to an actor upon an associated alarm event. Actors can be services within network video recorder 1. For example, a motion detection event triggers an alarm for IP camera 3 and alarm delivery service 13 functions to send a message to scheduler 18 to initiate a media recording session. Another example is an I/O trigger event. Alarm delivery service 13 may also transmit a message to a person via email, text, paging, or phone call. Alarm delivery service 13 also functions to log all alarms to SQL database 21.

Network video recorder 1 includes media recorder 10 which is a service program instantiated and executed by the processor module to record video files. Media recorder 10 functions to receive an IP address from scheduler 18 of a selected IP security device, set up an RTSP streaming media session (audio or video) with the selected IP security device, and record the video session after appropriate decoding into media database 20. A preferred file format for storing recorded video files in media database 20 is the .asf format from Microsoft.

Media recorder 10 further functions in coordination with database groomer 14 to organize recorded video session files on media database 20, managing disk space and storage blocks to accomplish an efficient storage and subsequent file streaming. Media recorder 10 pre-allocates block space for each video file. Pre-allocation of block space avoids fragmentation of the disk drive and eventual slowing due to re-write access. Examples of pre-allocated block space include one gigabyte per video file before FIFO deletion.

Media recorder 10 serves recorded video files as streaming video files over the LAN or WAN to IP client station 2 and to the video monitor port of network video recorder 1. In selecting recorded video files for streaming, media recorder 10 functions to respond to search queries received from IP client station. The search queries are performed on events in the XML metadata files in SQL database and on an index of recorded video files stored on the SATA drive. The result of a search query is a segment of recorded video with a defined start and end-time.

In one embodiment. IP client station 2 operates a hybrid program consisting of a web browser to communicate with the HTTP server and a locally executable program to communicate directly with media recorder 10, SQL database 21 and IP security devices.

For example, IP client station 2 functions in coordination with SQL database 21 to obtain the IP address for IP camera 3 and initiate a streaming video session (or streaming audio session) from IP camera 3 to IP client station 2. If the IP address is on the local LAN connecting IP client station 2 to network video recorder, then the resultant streaming session is set up on LAN-based connection 5. If the IP address is not on the local LAN, then IP client station 2 requests a streaming session on WAN-based connection 7 via proxy server 6. The streaming session is typically an RSTP session set up according to an API interface on the IP camera.

IP client station 2 is further programmed to query SQL database 21 and receive responses describing events and alarms as stored in association with IP camera 3.

It is to be understood that the hybrid program is electronically stored within the hardware of IP client station 2 as the downloaded client software and is instantiated and executed by a processor within the IP client station 2. The network video recorder is also programmed to execute the hybrid program, using the network video recorder's VGA output and USB ports for keyboard and mouse control.

Figure 11:
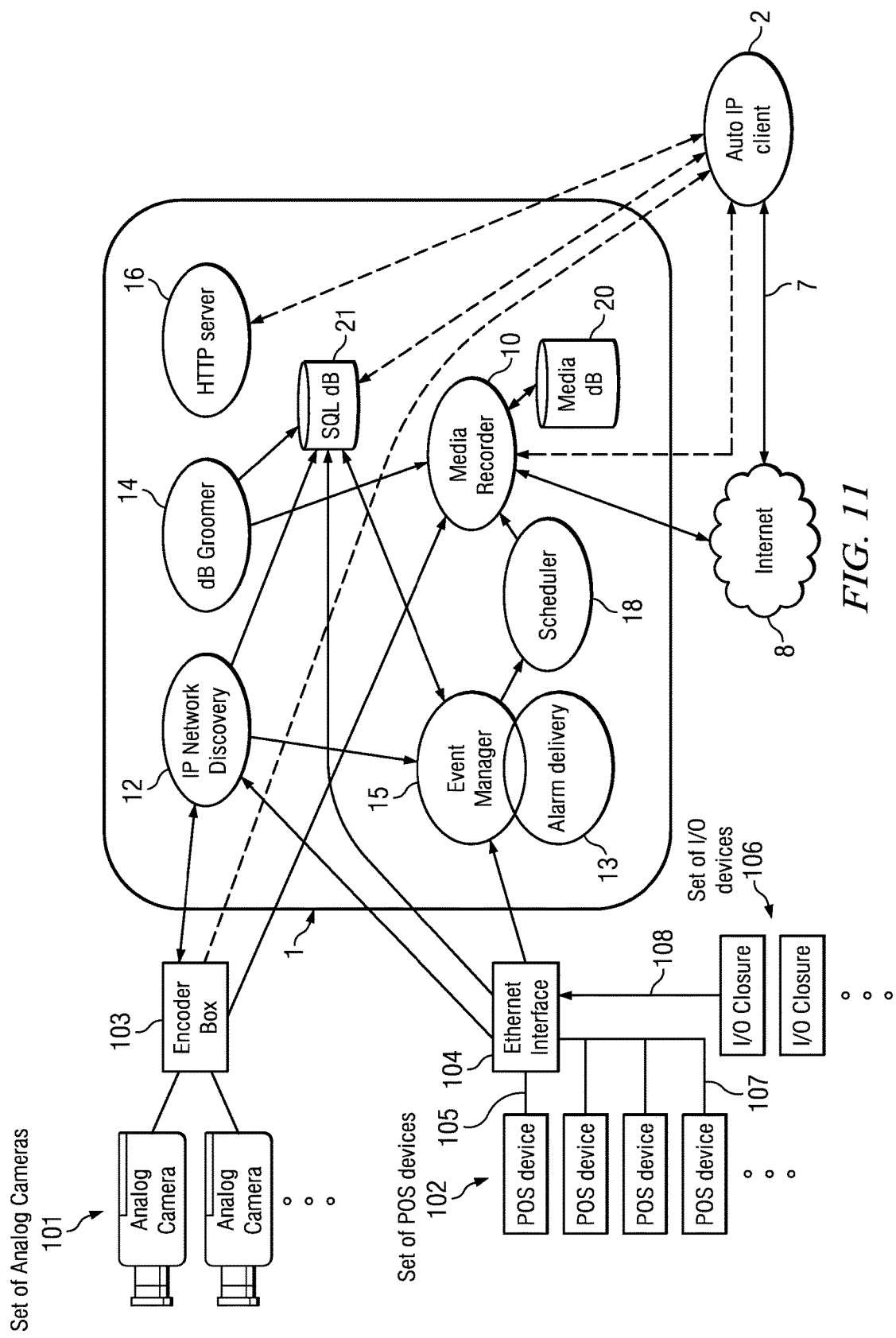
FIG. 11 is a functional block diagram of the system functionality of a preferred embodiment network video recorder system including legacy security devices.

FIG. 11 shows a functional block diagram of another preferred embodiment of the network video system 1 wherein network video recorder 1 operates with security devices that are not IP enabled. FIG. 11 is especially applicable to upgrading an existing campus having legacy security equipment such as set of analog cameras 101, a set of POS devices 102 or a set of I/O contacts (alarm contacts) 106.

In FIG. 11, network video recorder 1 includes the functions as previously described for FIG. 10. An IP client station 2 interacts with network video recorder 1 via a LAN connection or via internet 8.

Set of analog cameras 101 is connected to an encoder box 103 which is further connected by Ethernet LAN to network video recorder 1, the encoder box functioning to encode analog video signals into an encoded format such as H.264. Encoder box 103 is discoverable by IP network discovery 12. Media recorder 10 functions to select at least one camera from the set of analog cameras through communications with encoder box 103 and stream video from encoder box 103 to recorded video files stored in media database 20. Media recorder 10 also functions to stream video directly from encoder box 103 to the video display monitor of the network video recorder. IP client station 2 functions to stream video directly from encoder box 103 for display.

For point of sale (POS) applications, set of POS devices 102 are connected to an Ethernet interface 104 which is further connected by Ethernet LAN to network video recorder 1, the Ethernet interface functioning to translate physical signals from each POS device into all IP packet stream, the physical signals representing transactions such as the logging in/out of a teller or a sales clerk. For example, a first POS device is connected by a RS232 serial link 105 to Ethernet interface 104 programmed to translate the RS232 serial data stream into an IP packet stream. A second set of POS devices are connected by a databus to Ethernet interface 104 is programmed to translate databus signals into an IP packet stream. Event manager 15 is programmed to receive IP packet streams from Ethernet interface 104 and parse the data for POS events.

For alarm applications, set of I/O closure devices 106 are connected by wired connections to Ethernet interface 104 the Ethernet interface functioning to translate physical closure events from each I/O closure device into an IP packet stream describing the event. Event manager 15 is programmed to receive IP packet streams from Ethernet interface 104 and parse the data for I/O closure events.

Event manager 15 is further programmed to store information about each parsed event in SQL database 21, the information including at least the source of the event, the timestamp of the event, and a priority for the event. Attached to event manager 15 is alarm delivery service 13. Alarm delivery service 13 functions to create alarm events based on event thresholds, associate alarms to actors, and to deliver a communication to an actor upon an associated alarm event. Actors can be services within network video recorder 1. For example, an I/O closure event triggers an alarm and alarm delivery service 13 functions to send a message to a person via email, text, paging, or smart phone push. Alarm delivery service 13 also functions to log all alarms to SQL database 21.

In one embodiment the smart phone push is a simple SMS text message. In other embodiments, smart phone applications are conceived that continuously operate on the smart phone to receive event information in real time over the internet, display the event information and provide user options for response. In other embodiments, a fully functional IP client station is implemented in a smart phone application allowing a user to fully interact with network video recorder and video devices. The HTTP server of the network video recorder is configured to recognize the device type of the IP client station, including smart phone devices and serve web pages suitable for smart phone web browsers and hybrid smart phone applications. Suitable smart phones are at least the iPhone set of devices from Apple Computer, Inc and the Android operating system based devices available from many different hardware vendors, the Android operating system being a product developed by the Open Handset Alliance.

IP client station 2 is programmed to query SQL database 21 and receive responses describing events and alarms as stored in association with encoder box 103 and Ethernet interface 104.

Media recorder 10 functions to select at least one camera from the set of analog cameras through communications with encoder box 103 and stream video from encoder box 103 to recorded video files stored in media database 20. Media recorder 10 also functions to stream video directly from encoder box 103 to the video display monitor of the network video recorder. IP Client station 2 functions to stream video to display directly from encoder box 103 for live video files and via media recorder 10 from recorded video files.

Figure 12:
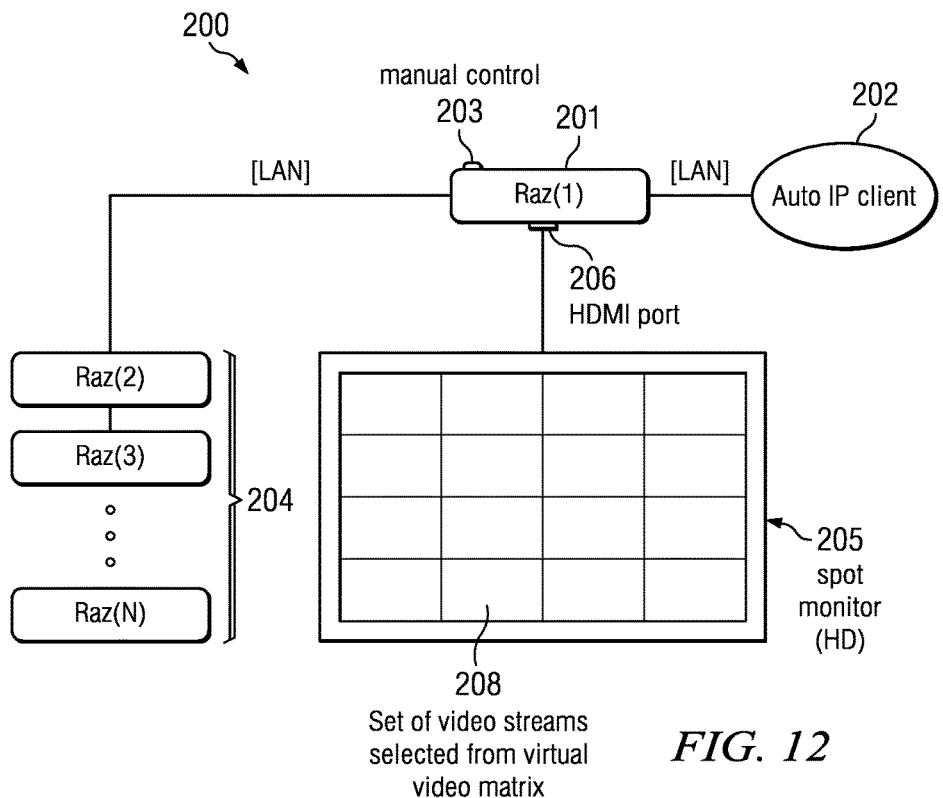
FIG. 12 is a block diagram of virtual video matrix according to the preferred embodiment.

FIG. 12 is a block diagram depicting a virtual video matrix system 200 enabled by the third exemplary embodiment of the carrier board. Virtual video matrix system 200 comprises a video recorder device 201 connected by a local area network to a set of video recorder devices 204. Video recorder device 201 includes a carrier board configured with a high definition video subsystem as described in relation to FIGS. 8A and 8B. The high definition video subsystem is a discoverable network device on the local area network, having an IP address to enable communications to/from any device attached on the local area network. The high definition video subsystem includes HDMI port 206 for exporting HD video signals to a spot monitor 205 capable of displaying high definition video. The HD video signals comprise a set of video streams, each of which are displayed by spot monitor 205. While the preferred embodiment includes a 4×4 matrix display capable of simultaneously displaying 16 video streams, the present invention is not limited by a size or number of displayed video streams.

A virtual video matrix comprises a set of video streams available from all camera devices connected to the set of video recorder devices 204 and video recorder device 201. A manual control 203 is included on first video recorder device 201 for selecting video scenes from the virtual video matrix. Selection of video scenes can also be accomplished by IP client station 202 which is connected to video recorder device 201.

In operation, spot monitor 205 is placed in proximity to video recorder device 201 and connected thereto. Video recorder device 201 and set of video recorder devices 204 are connected to the set of camera devices and further configured to compress and stream a set of compressed video streams from each of the set of camera devices to the high definition video processor subsystem in video recorder device 201. A subset of the compressed video streams is selected by the manual control provided on video recorder device 201. The high definition video subsystem then decompresses the selected compressed video streams and combines the resulting uncompressed video streams into a single composite video stream. The single composite video stream is converted to HDMI format by the high definition video subsystem and put out to the HDMI port where it is transmitted to the spot monitor and displayed.

In operation, video recorder device 201 acts as a master video recorder device. Each video recorder device in the set of video recorder devices 204, acts as a slave device. The master video recorder device receives instructions from the IP client station and transmits those instructions to each slave device. Accordingly, each slave device sends alarms and event information to the IP client station through the master video recorder device, which is configured to consolidate the information stored on the set of video recorder devices 204. In a preferred embodiment, the virtual video matrix system is operated by the master video recorder device.

If an auto IP client is connected to video recorder device 201, the compressed video streams can be selected for display via user interaction on the IP client station. The IP client station is configured to display a representation of the single composite video stream on a computer monitor showing detailed information relating to each compressed video stream.

Figure 13:
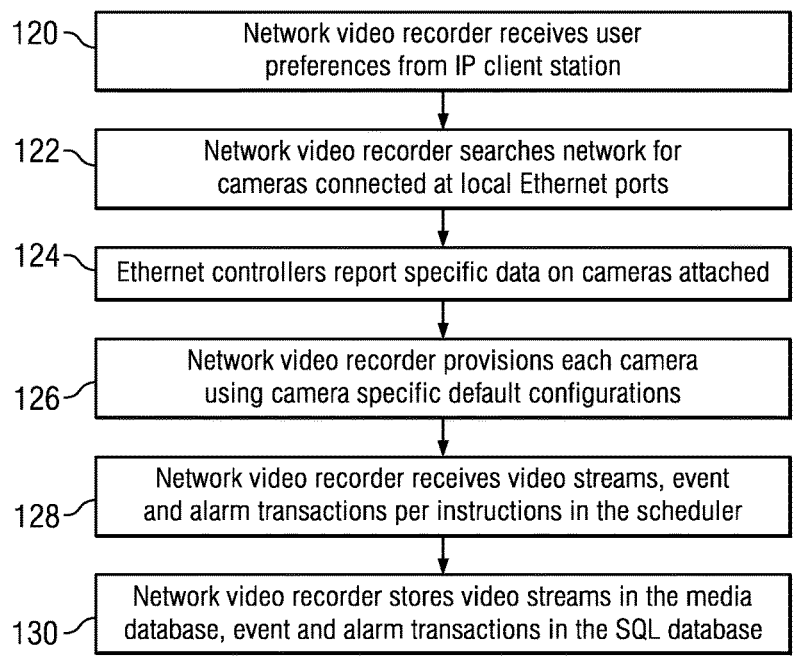
FIG. 13 is a flow diagram of the network video recorder in use.

Referring to FIGS. 10 and 13, in use, the network video recorder receives instructions from the IP client station at step 120, the instructions related to preferences of the user with respect to configuration of the network cameras. For example, camera choices, delay times, and PTZ parameters are selected through a graphic user interface produced by the client software operating on the IP client station.

At step 122, the IP network discovery service running on the network video recorder searches the network for available cameras connected at the RJ45 ports. At step 124, the Ethernet port controller associated to each RJ45 port reports specific connectivity data on a connected camera or other network security device including a fixed Mac-address, if available, which is stored in the SQL database. At step 126, the network video recorder then configures, i.e., programs each of the cameras, according to camera specific data stored in the persistent memory (compact flash memory or mass storage device).

Once configured, step 128 is performed wherein the media recorder sets up streaming protocol channels to the cameras, and the event manager receives event and alarm data from the cameras including video streams and event transactions, according to instructions from the scheduler. At step 130, video streams are stored in the media database and event/alarm transactions are stored in the SQL database via the mass storage device on the SATA port.

Figure 25:
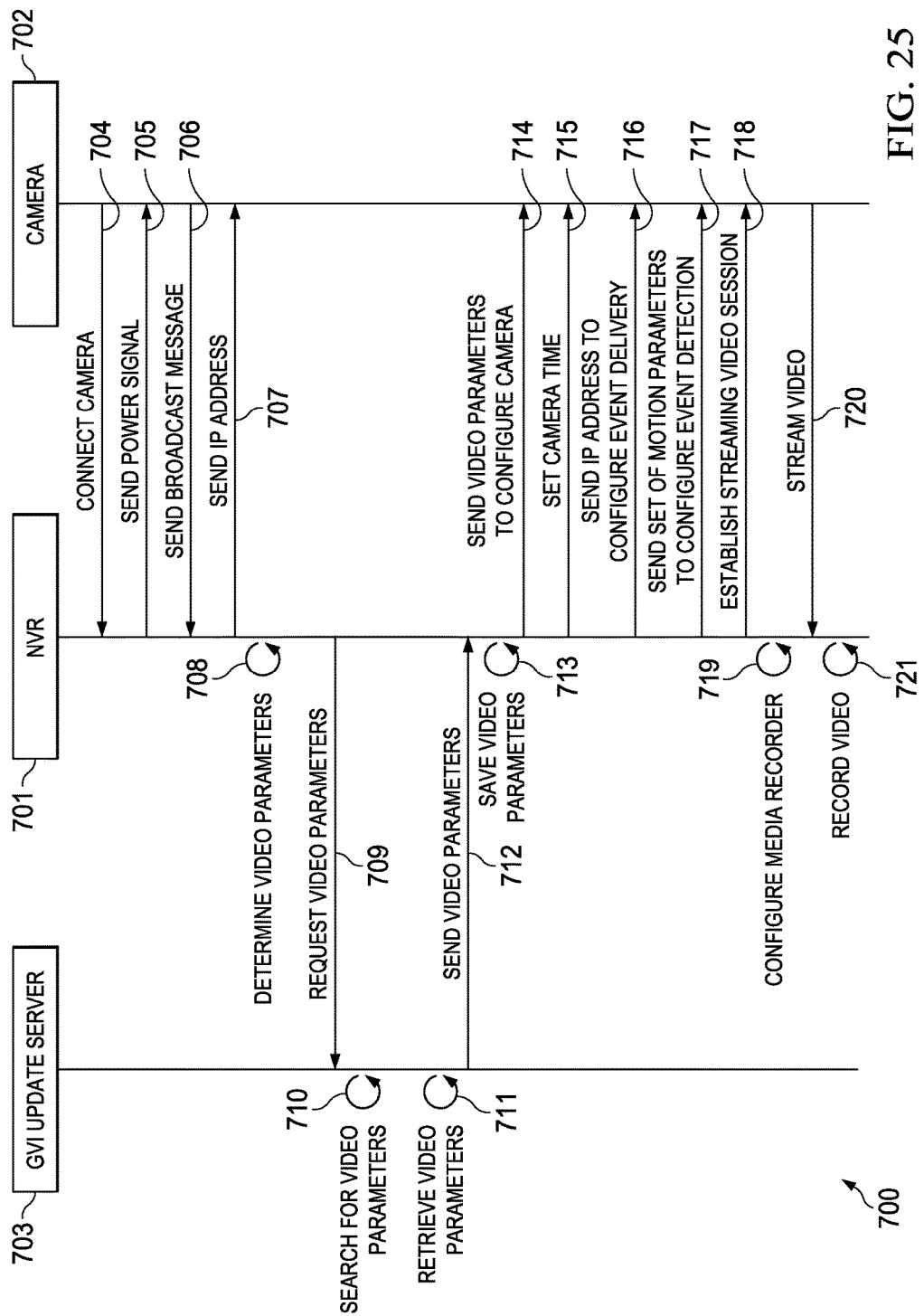
FIG. 25 is a time sequence diagram of an IP network discovery and automatic configuration process in the preferred embodiment.

IP network discovery and automatic configuration is further explained using the time sequence diagram of FIG. 25. Automatic configuring process 700 involves a network video recorder (NVR) 701, a set of cameras including camera 702, and GVI update server 703. The interaction between NVR 701 and camera 702, and NVR 701 and GVI update server 703 is depicted in a time sequence where time progresses from the top of the diagram to the bottom. At step 704, camera 702 is connected to a LAN Ethernet port of NVR 701. At step 705, the LAN Ethernet port of NVR 701 provides power to camera 702 by sending a power signal to the camera via PoE protocol (see IEEE standards 802.3af and 802.2 at). At step 706, camera 702 broadcasts a "hello" message using Bonjour or similar networking protocol to send a set of connectivity data that includes make, model, inherent capabilities, and MAC address to NVR 701. At step 707, NVR 701 provides an IP address to camera 702 via the NVR's DHCP service.

At step 708, NVR 701 determines a set of video parameters for camera 702 based on the set of connectivity data. The set of video parameters includes at least the parameters related to video compression, video frame rate, video quality, video resolution and data transfer rate for the cameras. In this step, NVR 701 searches the SQL database for a match between the set of connectivity data and the set of video parameters. If a match is determined, then process 700 proceeds to step 714. If a match is not determined, then process 700 proceeds to step 709. At step 709, NVR 701 requests the set of video parameters from GVI update server 703. At step 710, GVI update server 703 searches its database for the requested set of video parameters. At step 711, GVI update server 703 retrieves the requested set of video parameters. At step 712, GVI update server 703 sends the set of video parameters to NVR 701. At step 713, NVR 701 saves the set of video parameters into memory.

At step 714, NVR 701 sends the set of video parameters to configure camera 702 with the set of video parameters. At step 715, NVR 701 synchronizes the camera time by providing an NTP service. At step 716, NVR 701 sets up event delivery for camera 702 by communicating NVR's IP address to camera 702 as the destination IP address for camera events. At step 717, NVR 701 sets up motion detection in camera 702 by communicating motion related parameters including at least the motion area and motion detection sensitivity. At step 718, a streaming video session is established by NVR 701 between camera 702 and NVR 701. The streaming video session is preferably set up as an RTSP (real-time streaming protocol) session. At step 719, NVR 701 configures its media recorder to record streaming video. At step 720, camera 702 streams video to NVR 701 via the established streaming video session. The video is streamed across the LAN preferably using one of UDP over IP protocol and TCP over IP protocol. At step 721, NVR 701 receives and records the established streaming video session.

FIGS. 14-18 describe an embodiment of the IP client station. The IP client station is preferably a PC workstation such as a laptop computer which supports a Microsoft Windows operating system. IP client station is configured to execute a client application downloaded from the network video recorder. A hybrid program with native components and web browser components is electronically stored within the hardware of IP client station 2 as the downloaded client software and is instantiated and executed by a processor within the IP client station.

Figure 14:
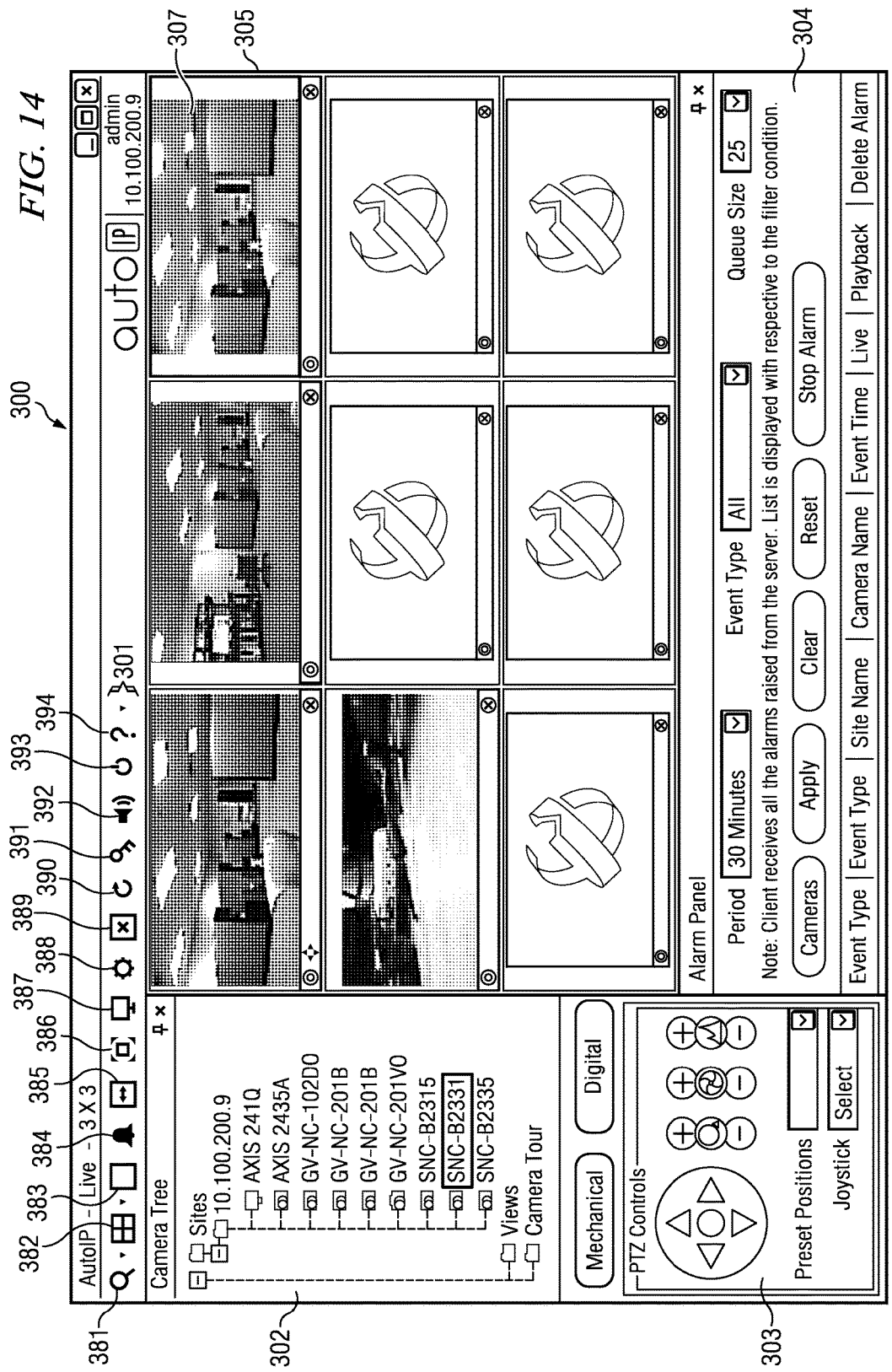
FIG. 14 is a screen shot of the graphical user interface of an IP client station.

FIG. 14 is a screen shot of the IP client graphical user interface (GUI) 300 of the IP client station while operating in a Microsoft windows operating system running on the PC workstation. IP client GUI 300 comprises a tool bar area 301 having a set of selectable icons for executing the various functions of the IP client station. IP client GUI 300 further comprises a tree view area 302 for displaying and selecting a set of sites, a set of cameras assigned to each site, views of video streams from the set of cameras, and a camera tour.

IP client GUI 300 also comprises a video view area 305 further comprising a set of video panels wherein each video panel is associated to a video stream selected from the group of a single camera and of multiple cameras in a camera tour.

An instrument view area 304 is provided in the lower section of IP client GUI 300. In the preferred embodiment, the instrument view area 300 displays an alarm panel GUI or a slider panel GUI.

A camera control area 303 is included in IP client GUI 300 with mechanical camera controls and digital camera controls. The mechanical camera controls indicated in FIG. 14 are programmed to interact with the PTZ functions of a specific camera. The digital camera controls are programmed to perform a zoom function on live or played back video streams.

Figure 15:
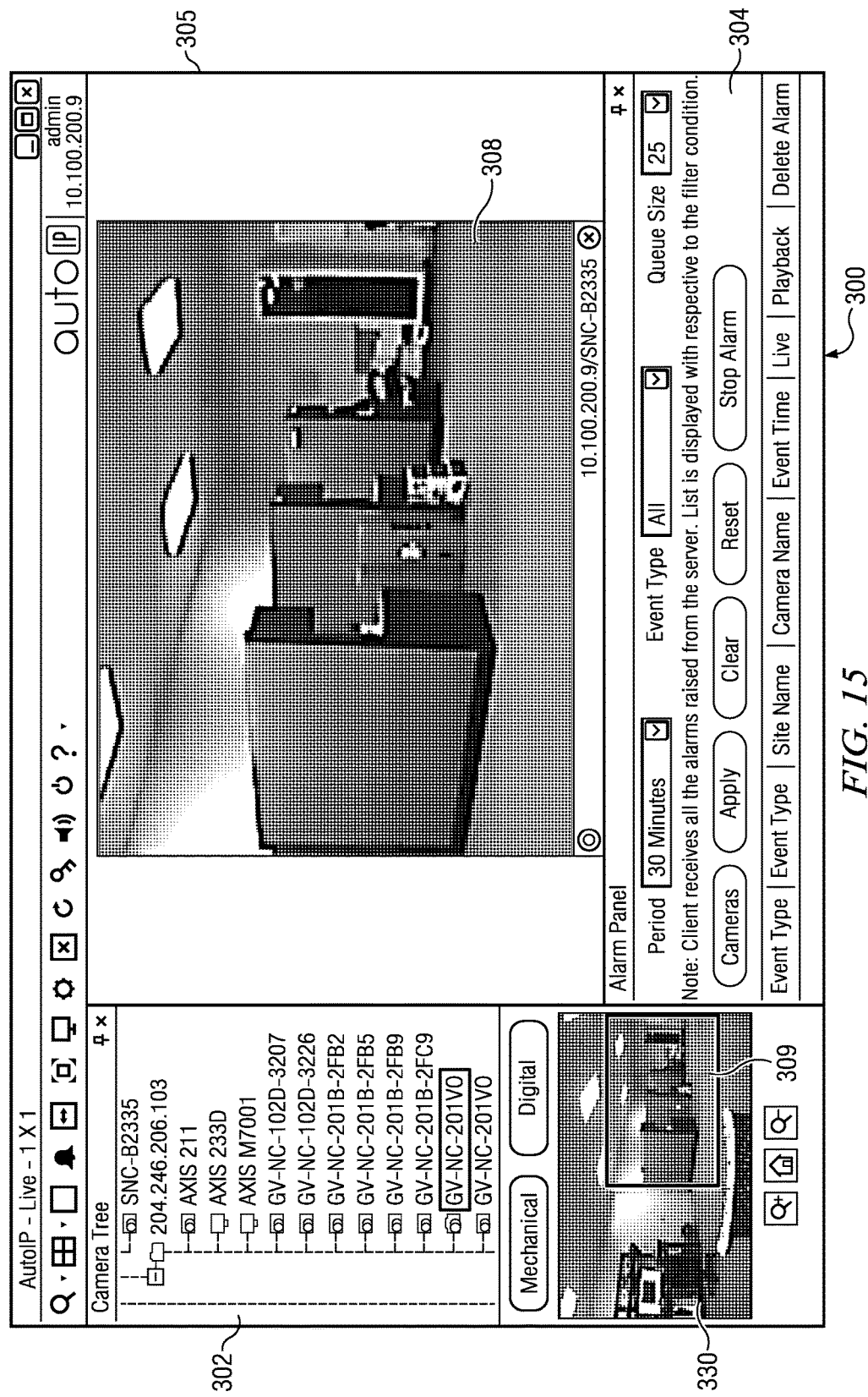
FIG. 15 is a screen shot of the graphical user interface of an IP client station showing the camera control functions.

In FIG. 15, IP client GUI 300 is configured with digital view controls 330 in the camera control area. Digital view controls 330 operate on a camera video stream associated to a camera selected from the camera tree within tree view area 302. Digital view controls 330 include an adjustable zoom box 309 object that when set displays a zoomed video stream 308 as a single video panel in video view area 305.

Figure 16:
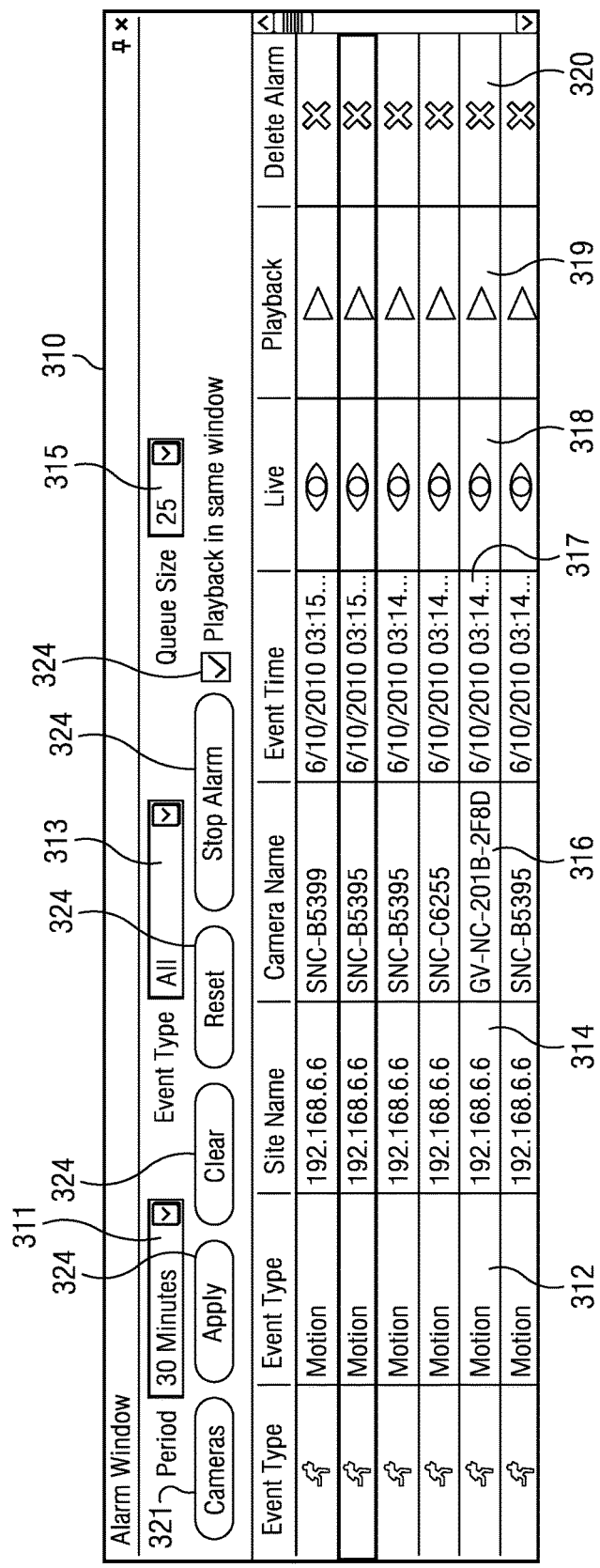
FIG. 16 is a screen shot of an alarm window of the graphical user interface of an IP client station.

Alarm panel GUI 310 is shown in FIG. 16 having a time period control 311, an event type control 313 and a queue size control 315. Alarm panel GUI 310 has a camera control 321 for selecting cameras. Alarm panel GUI 310 includes a set of operating controls 324 to control perform various alarm related functions as will be explained below. Alarms are displayed in rows of alarm panel GUI 310 with columns indicating event type 312, site name 314, camera 316, event time 317, a set of selectors for live video 318, a set of selectors for playback video 319, and a set of delete buttons 320.

Figure 17:
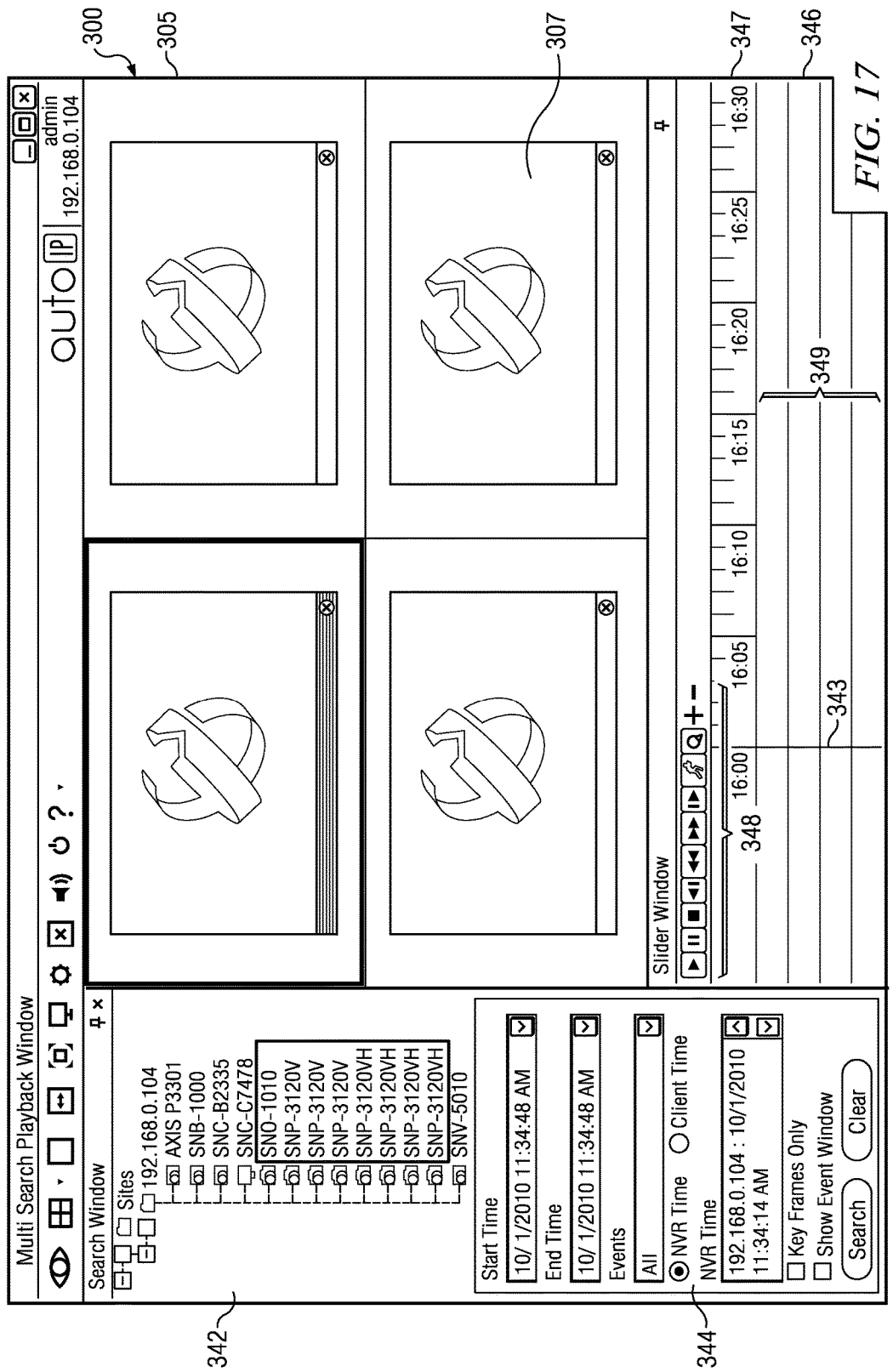
FIG. 17 is a screen shot of the graphical user interface of an IP client station showing the multi-user playback window and related search window.

In FIG. 17, IP client GUI 300 is configured to operate a multi-search playback window comprising a search window 342 in the tree view area, a camera search dialog 344 in the camera controls area, a set of video panels 307 in the video view area and slider panel 346 in the instrument view area. Slider panel 346 comprises a set of track bars, one track bar for each video panel in the set of video panels, wherein the track bars are displayed on a time scale 347 with a tracking time indicator 343 indicating a point of time in a video stream. A set of slider controls 348 are included in slider panel 346 to control the tracking of video streams.

Figure 18:
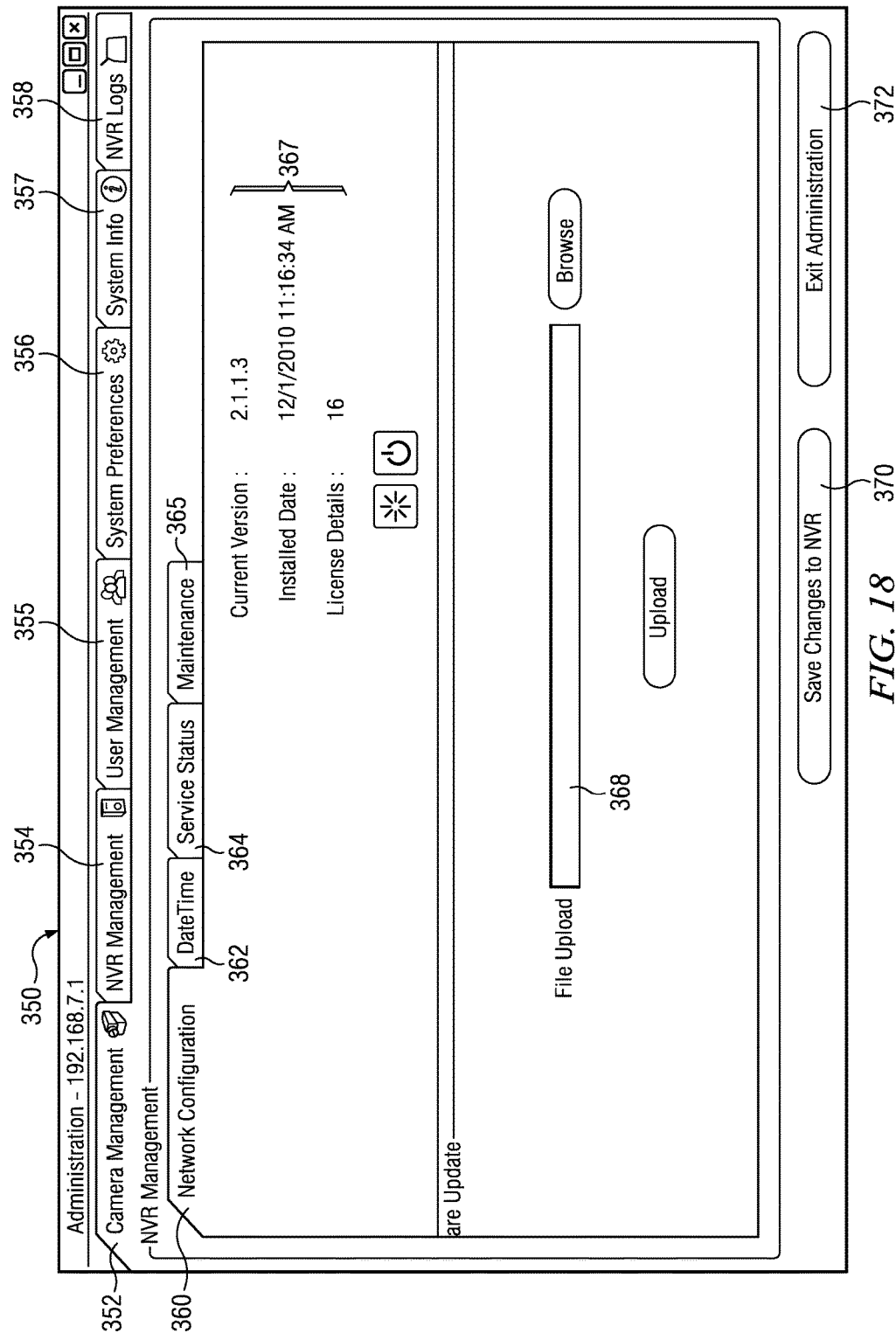
FIG. 18 is a screen shot of the graphical user interface of an IP client station showing site administration functions.

In FIG. 18, a site administration GUI 350 is shown in another screen shot. Site administration GUI 350 includes a set of dialogs accessible by selectable tabs displayed in the GUI window. The set of dialogs comprise a camera management dialog 352, an NVR management dialog 354, a user management dialog 355, a system preferences dialog 356, a system information dialog 357 and an NVR logs dialog 358. The NVR management dialog 354 is opened and further includes a set of NVR management functions including network configuration dialog 360, datetime dialog 362, service status dialog 364 and a maintenance dialog 365. The maintenance dialog is opened showing software status 367 and an upload tool 368 for uploading IP client software updates from the NVR server to the IP client station. At the bottom of the screen shot is shown a button 370 used to save changes to the NVR server and exit button 372 to exit site administration GUI 350, stopping its execution. All of the dialogs in site administration GUI contain buttons 370 and 372.

Referring to FIGS. 14-18 and 19-24, operation of the IP client application functions will be described.

Figure 19:
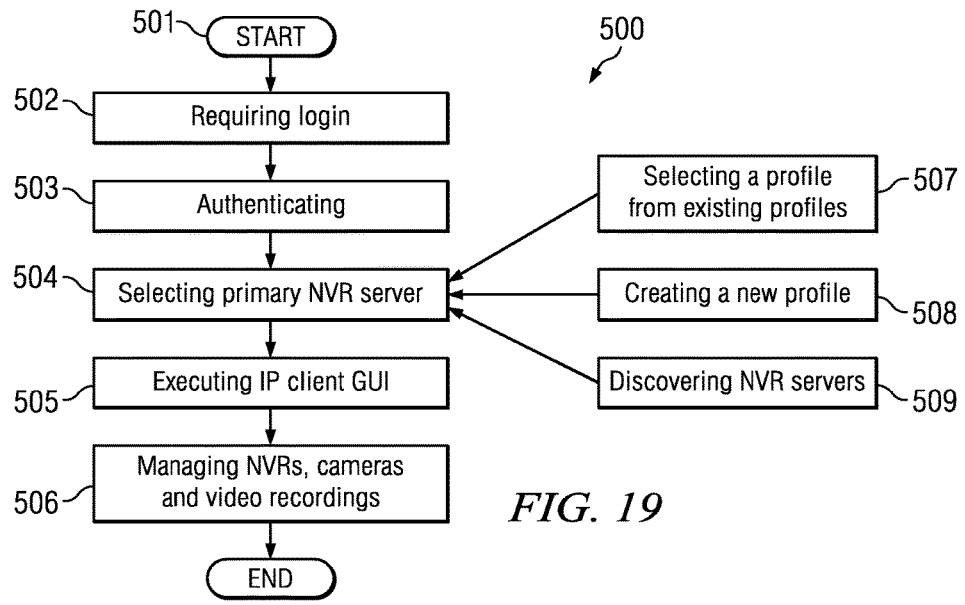
FIG. 19 is a flow chart of a general method of use for an IP client station.

Beginning with method 500 of FIG. 19, IP client station is started at step 501. At step 502, a user is required to login to the IP client application to access its functions and features. After authentication at step 503, a dialog is presented to the user at step 504 where a NVR server is chosen as a primary NVR server for the IP client station. The NVR server is chosen according to one of steps 507, 508 and 509: at step 507, by selecting a profile from an existing set of profiles; at step 508 by creating a new profile; and, at step 509 by automatically discovering a NVR server attached to the local area network. If a network video recorder is in a remote network a remote IP address is required to discover a NVR server.

A multi-site login feature allows users to access more than one server from the IP client GUI including a primary server and a set of second servers. The primary server is the server with which the user initially logs in. For example, if the user logs into a server with an IP address of 10.100.200.9, then this IP address is referred to as the primary server and can be seen under the "sites" folder in the tree view area. Secondary servers are added as described below.

Creating a profile, at step 508, involves the steps of selecting a profile name, adding a set of sites to the profile, setting an IP address for an NVR server for each site by setting a username, setting a password associated to the username, setting a connection type as either LAN or remote, configuring the HTTP and RTSP ports, editing a text description of the NVR, and saving the profile. Additional sites can be added to the profile at a later time and the profile can be edited with updated information as required.

In the step 509 of discovering a NVR server, IP client application executes a zero configuration protocol to discover a list of available NVR servers with their corresponding IP addresses. A profile is created and edited from the resulting list of discovered NVR servers.

At step 505, a graphical user interface (GUI) similar to that of FIG. 14 is displayed and operated allowing the IP client application to perform a wide range of functions. The name of the user and the IP address of the primary NVR server are displayed in a visible area.

At step 506, a means for executing various functions to manage all attached NVR servers, all cameras in the networks of each attached NVR server, and video recordings stored in the attached NVR servers.

In the preferred embodiment, a menu of icons in a tool bar is provided in the GUI that when selected allows the various functions to be performed. As shown in FIG. 14, the tool bar area operates as follows. Selecting the camera bar icon 383 opens a camera tree view. Selecting the search icon 381 opens a multi-search window as described below. Selecting an alarm icon 384 displays an alarm panel in the instrument panel area. Selecting a layout icon 382 allows a user to set a video viewing format in the view area. Video viewing formats relate to the number of video streams displayed simultaneously as video panels in the view area. For example, a single view displays only one video panel consuming the entire view area; a 4×4 view displays sixteen video panels in the view area. Selecting a fit screen icon 385 adjusts a set of selected video streams to fit the entire video view area leaving the tool bar menu, tree view area, camera control area, instrument panel area, and operating system menus visible. Selecting a full screen icon 386 adjusts a set of selected video streams to fit the entire GUI area leaving the tool bar menu and operating system menus visible. Selecting a monitor screen icon 387 adjusts a set of selected video streams to fit the entire display screen and hiding the tool bar menu and the operating system menus. Selecting a refresh icon 390 refreshes all video streams in the video view area and all information in the tree view area and the instrument panel area. Selecting a mute icon 392 mutes any available audio originating from the set of video streams. Selecting a "close all" icon 389 closes all camera windows leaving only the toolbar menu and the tree view area.

Selecting an admin icon 388 displays an administration window wherein a user logs on as an administrator. Selecting a log off icon 391 logs the user out of the IP client application and leaves the GUI running, displaying a log-on screen. Selecting an exit icon 393 closes the IP client application after asking the user to confirm. Selecting a help icon 394 displays a dropdown of help options.

Figure 20:
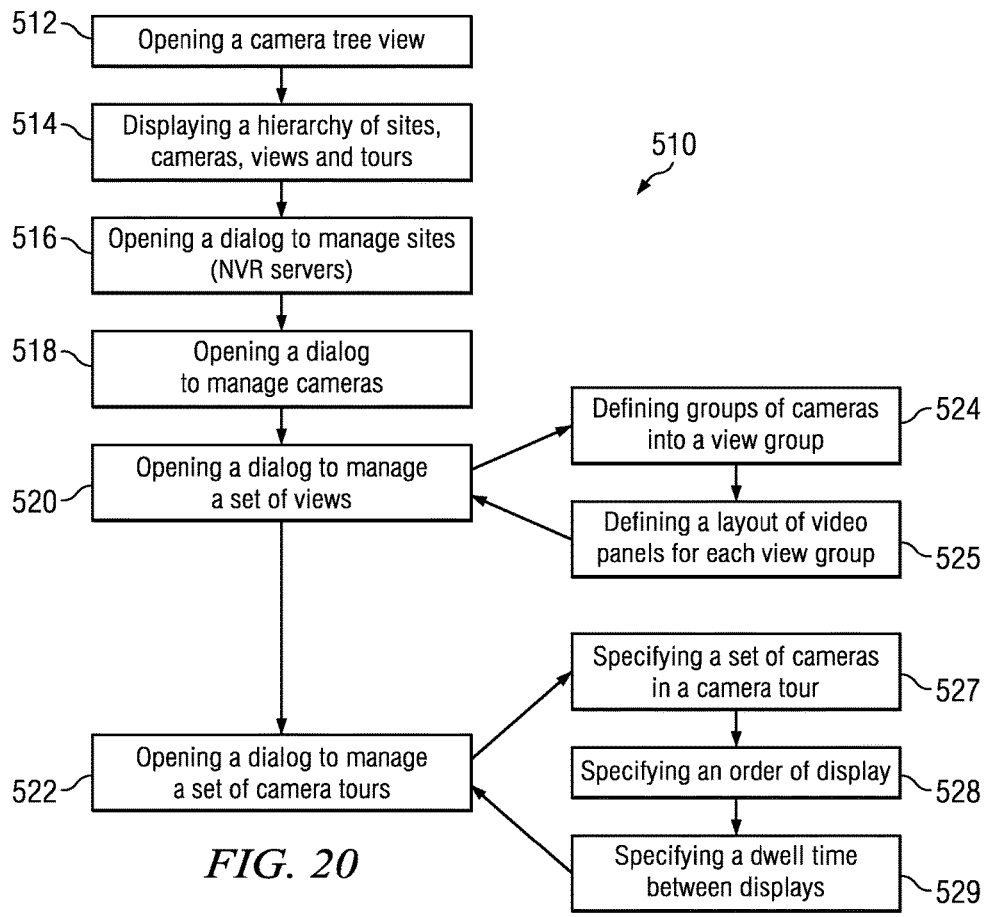
FIG. 20 is a flow chart of a method to manage sites and cameras using an IP client station.

FIG. 20 shows a method 510 to manage a set of sites, a set of cameras attached to the network at each site, a set of views and a set of camera tours. At step 512, selecting a camera bar icon in the tool bar area opens a camera tree view. At step 514, a camera tree is displayed in the tree view area including a hierarchical tree level view of a list of sites which is a list of NVR servers, a list of cameras attached to each NVR server, a set of pre-defined camera views and a set of pre-defined camera tours.

The camera tree view functions as follows. Entities in the camera tree view are normally opened by "left-selecting" for display by left-clicking with a mouse pointer on the entity's icon or by clicking an adjacent "+" icon. Properties of the entity are normally opened for display and editing by "right-selecting" which is right-clicking with a mouse on the entity's icon. The cameras in the network display in a tree structure with associated icons which indicate if a camera is online, is not online, is a PTZ capable camera, and is not a PTZ capable camera.

At step 516, a sites dialog is opened to manage sites by right-selecting the "sites" folder. Multiple sites can be added to a profile by choosing to add a new site in the sites dialog. If the user chooses to add a new site, the GUI displays a new login form wherein the user can manually enter the site information or use server discovery. Using the camera tree view, the user can connect to "N" number of secondary NVR servers. For example, if the user logs into the NVR server with the IP address of 10.100.200.9 (primary server) with a profile, then adds an additional secondary NVR server with an IP address of 204.246.206.103, then the newly added secondary site appears under the "sites" folder with its corresponding IP address by default. Sites can be renamed to make the "site" folder displays more useful. Cameras in a given site can be viewed by right-selecting a site folder.

Further to step 516, the "sites" dialog allows for disconnecting or connecting a site from communications with the IP client station. By default, a site folder icon and all of its camera icons appear in red in the camera tree when it is disconnected. The "sites" dialog also allows for deletion of the site. In the preferred embodiment, the primary site cannot be deleted.

The "sites" dialog allows for a site administrator application to execute. Alternatively, the "admin" icon on the toolbar menu can be selected to execute the site administrator. The site administrator application displays and operates an Administration page for a selected site as described further below.

A subset of layouts are predefined and stored within a view group's folder which is displayed in the camera tree. At step 520, views are managed by right-selecting the view group's icon to open a views dialog. At step 524, a set of view groups are created within a folder according to views dialog. A view group is a named folder used to hold a description and a set of view layouts. At step 525 the set of view layouts are created in the views dialog from a selected set of cameras. A view layout has a name, a description, a set of assigned video streams. Once created, existing view groups can be edited and deleted. For example, a view group for a warehouse contains a single 2×2 view layout simultaneously displaying four video streams from an outside door, a first set of inventory, a second set of inventory and an office.

Specifications for a set of camera tours are predefined and stored within a camera tours folder and the set of camera tours are displayed in the camera tree by left-selecting the camera tours folder. A camera tour displays a set of live video streams from a set of cameras in the set of video panels. A camera tour skips any offline cameras while displaying.

At step 522, a camera tour is added by right-selecting the camera tours folder. At step 527, the set of cameras is selected for a given camera tour. At step 528, the order of display is specified for the given camera tour. At step 528, a uniform dwell time is specified between each video stream display for the given camera tour. A camera tour can also be deleted or edited wherein individual cameras can be removed or added to an existing camera tour.

From the camera tree view, a live video stream is displayed in a video panel by dragging and dropping the camera name from the camera tree on the left into the video view area, double-clicking on the desired camera name, or right-selecting the camera name then choosing "View Camera." A live video stream may be deleted by clicking an "unpin" icon indicated near the live video display.

In the preferred embodiment of the IP client GUI, the live video window initializes after login by default showing the camera tree in the tree view area, a set of video panels in the video view area, PTZ and zoom controls in the camera controls area, and an alarm panel in the instrumental panel area.

Figure 21:
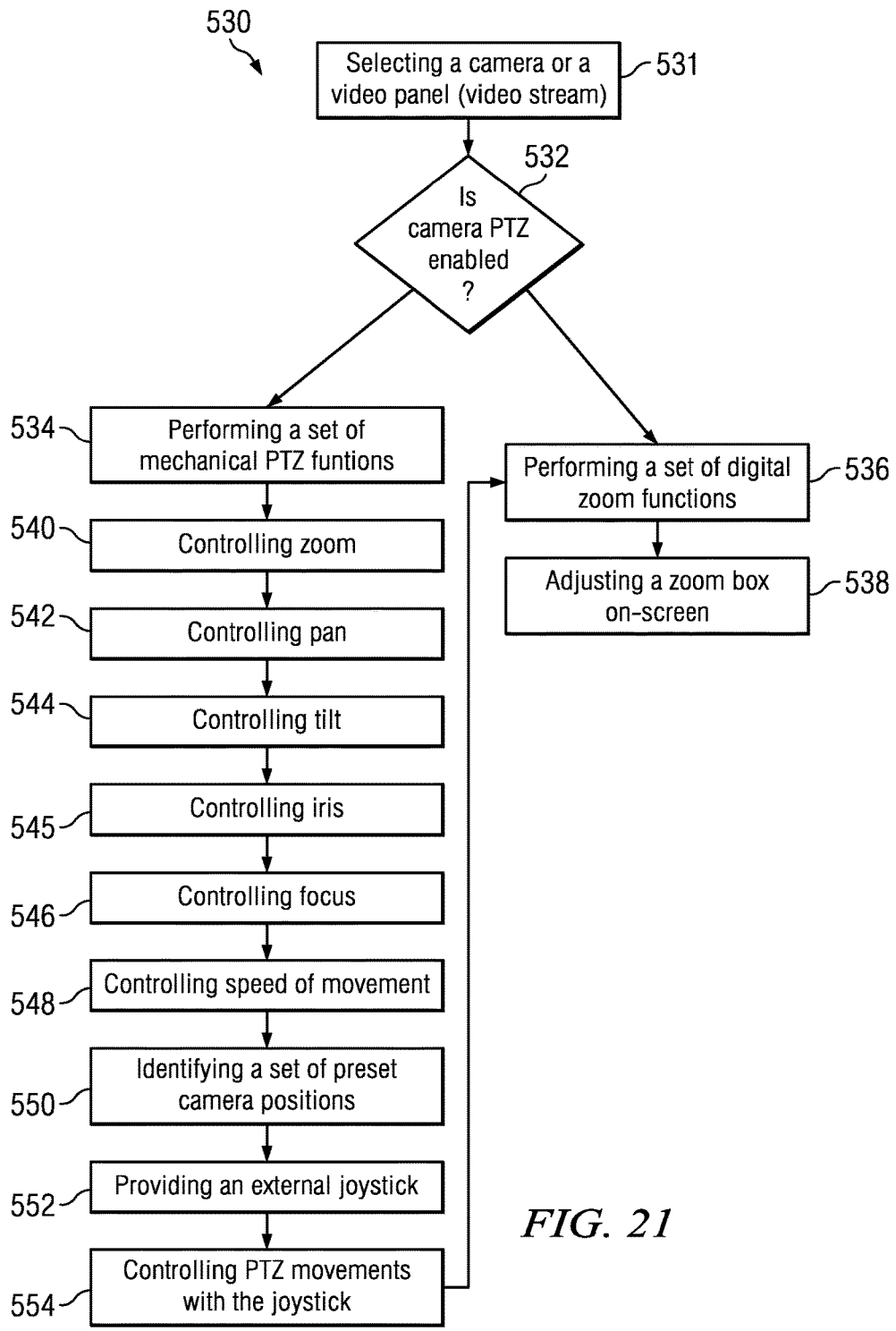
FIG. 21 is a flow chart of a method of camera control for an IP client station.

Within the camera control area the IP client GUI provides at least the following set of controls: mechanical control, digital control, digital zoom box, and set of PTZ controls. In FIG. 21, step 531, the camera controls are enabled by selecting a camera by clicking an icon in the camera tree view or by selecting a video panel in the video view area.

At step 532, the IP client GUI determines if the selected camera is PTZ enabled. If the selected camera is PTZ enabled then the camera controls operate in mechanical control mode 534. If the selected camera is not PTZ enabled then the camera controls operate in the digital zoom mode 536.

Digital zoom mode 536 is also enabled by selecting a digital control button. During live or playback video streaming, zoom is determined in step 538, by sizing an adjustable area defined by a digital zoom box positioned over a video panel as displayed in the camera control area. The picture corresponding to the selected digital zoom box is enlarged and displayed in the camera's live or playback view panel in the video view area.

Mechanical control mode 534 is also enabled by selecting a mechanical control button in the camera control area. In mechanical control mode 534, a set of PTZ controls are further enabled. For live video streams, the set of PTZ control interacts with a selected PTZ-enabled camera. The PTZ-enabled camera is selected by clicking on a live video panel in the video view area. The set of PTZ controls allows for controlling zoom 540, controlling pan 542, controlling tilt 544, controlling iris 545 and controlling focus 546. At step 548, PTZ speed of movement is set during preset PTZ tours. Furthermore, the set of PTZ controls include the use of preset camera positions, tours and settings. At step 550, preset positions are set and stored using the PTZ controls. When a preset position is selected, the PTZ-enabled camera automatically moves to the corresponding preset position. At step 552, an external joystick is attached to the IP client station, and at step 554, the external joystick control operates the PTZ control functions.

Figure 22:
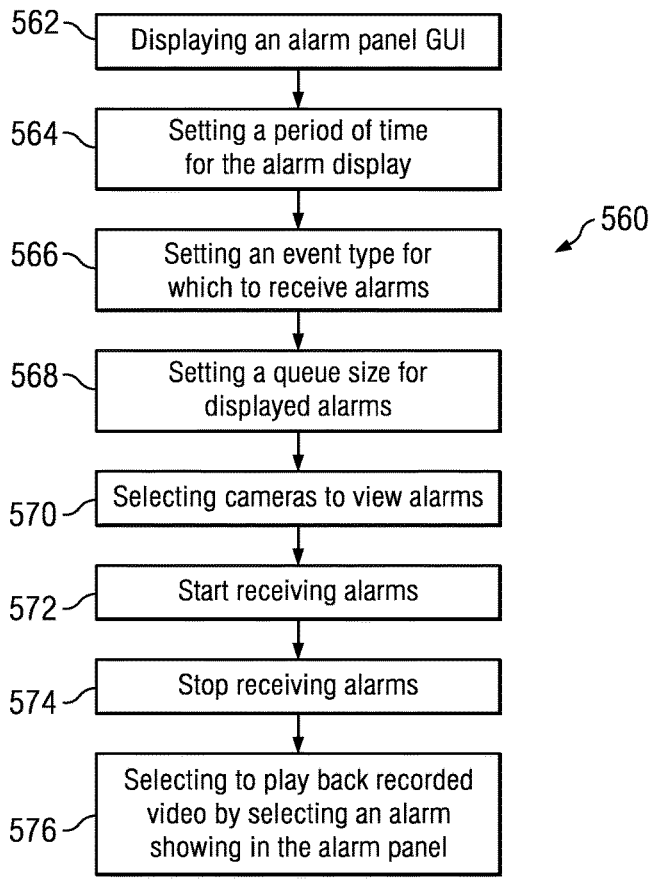
FIG. 22 is a flow chart of a method of alarm management using an IP client station.

Method 560 of FIG. 22 explains the function of an alarm panel (see FIG. 16 also). During live video streaming, at step 562, an alarm panel displays in the instrument panel area. The alarm panel can also be used as a shortcut for viewing playback video related to an alarm. The alarm panel is also turned on or off by clicking the alarm icon in the toolbar menu area.

Alarms are set up by entering and selecting information into the alarm panel for a given alarm. Fields of information and information selectors are available in the alarm panel. At step 564, the period of time for which alarms are displayed in the alarm panel is entered. At step 566, the type of events for receiving alarm notifications is selected from a list. At step 568 the maximum number of alarms displayed in the alarm panel is entered. At step 570, a camera selector dialog is opened to select cameras for viewing in the alarm panel. At step 572, alarm tracking is started. At step 574 alarm tracking is stopped. At step 576 a "playback in same window" selector is selected to playback recorded video within the video panel corresponding to the camera's live video stream.

IP client application includes functions to enable and enhance the playback of media files stored in the NVR servers. A multi-search playback function allows the IP client application to retrieve recorded videos from a selected NVR server for a set of selected cameras by date and time.

Figure 23:
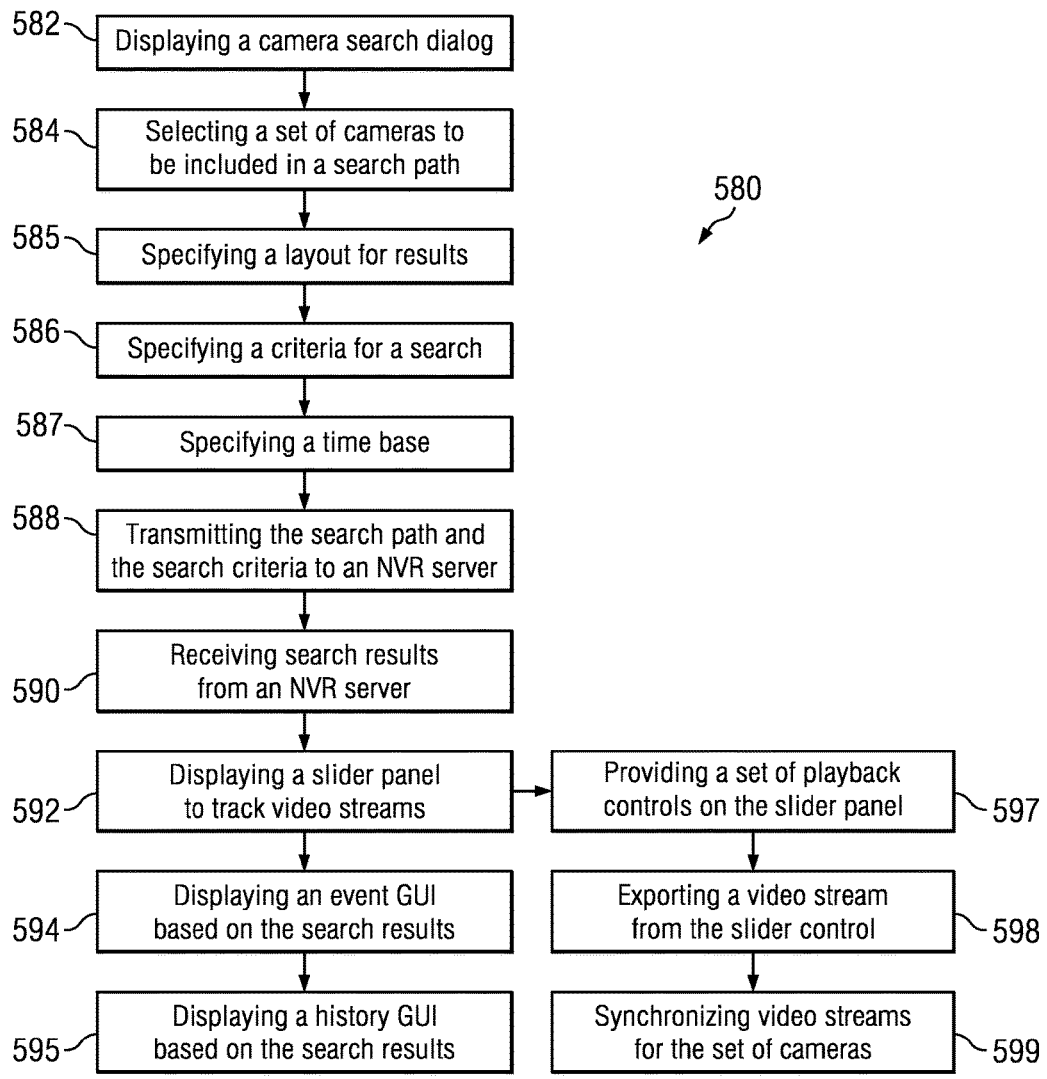
FIG. 23 is a flow chart of a search method and a playback method for video streams using an IP client station.

Referring to FIG. 23, according to method 580, a search window is opened by the IP client GUI at step 582. The search window automatically displays all available sites with all available cameras in the tree view area. At step 584 cameras are selected for inclusion in a search. In one embodiment, cameras listed in the search window are drag and dropped from the search window into a video panel in the video viewing area to build a search path. In another embodiment, each camera has an associated checkbox which when checked, includes the camera in the search path.

At step 585, the search window includes a selection of a video panel layout format in the video viewing area for the playback video streams. At step 587, searches are performed according to IP client local time or NVR local time according to user requirements. At step 586, a start time for the video search function is specified in the search window and an end time for each video stream is displayed in the search window. Search criterion are selected from the group of cameras, start time, end time, audio events, motion detection events, contact closure events, scheduled events and a combination thereof.

At step 588, selecting a search control activates a search based on the entered criteria by transmitting the search criterion and the selection of cameras to one or more NVR servers. The NVR servers perform the search functions to provide search results in the form of recorded video streams. At step 590, the search results are received by the IP client GUI and displayed according to the video panel layout format.

At step 592, a slider panel with a set of track bars displays the time between the start time and end time in the search criteria. At step 594, events returned from the search are displayed in an event window. Events in the event window are selected for viewing in the camera's assigned video panel according to the selected video panel layout format. Alternatively, selecting a camera's assigned view panel brings up all returned events for that camera in the event window.

At step 594, a history window is selected from the search window which displays camera logs as stored in the NVR server corresponding to the cameras. Selecting an entry in the history windows causes the corresponding video stream to appear in the corresponding camera's assigned video panel. The history window displays event history according to a searched start time and end time. After selecting a particular item from the list, the selected camera track and time period display in the slider panel.

At step 597, playback controls provided in the slider panel are manipulated to manage the video playback. The set of vertical tracking bars in the slider panel each move to a designated time as returned by the search while the corresponding playback video streams display in a video panel. A set of playback controls are included in the slider panel allowing individual control of each video stream selected in the search. During playback of multiple video streams, a slider control can be used to display video at a specific time by moving the slider control horizontally along a track. The set of playback controls also include play, pause, stop, step backward, rewind, step forward, fast forward, jog speed and export. According to step 599, a synchronization control allows the recorded video streams from multiple cameras to be played back synchronously or asynchronously, as selected.

At step 598, the export playback control causes recorded videos to be exported to local non-transitory storage media according to a set of menu driven options which include writing the video streams to files on a CD/DVD.

Each track bar is displayed in coded colors to distinguish playback features. Video panel layout options are also accessible via the slider panel during playback. Also, while in playback, the camera control area allows for digital zooming of recorded video streams.

Figure 24:
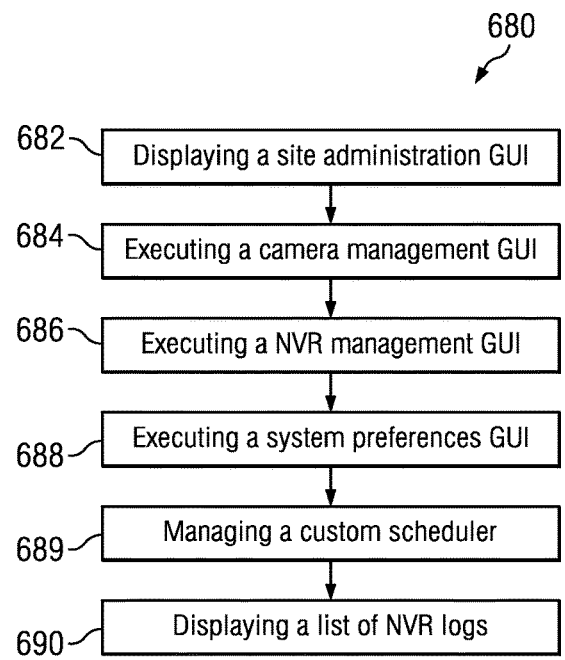
FIG. 24 is a flow chart of a site administration method using an IP client station.

Referring to FIG. 24, according to method 680, when the "admin" icon on the toolbar menu is opened or a right-selection of a particular site folder in the tree view area is followed by opening the site administrator, a site administration GUI is executed by the IP client station at step 682. Site administration is performed in collaboration with the NVR server associated to a site. Administrative changes are selected and set according to the site administration GUI. A means for saving changes to the NVR server is provided by as an apply or ok control in the window and a save changes control. A means for exiting the site administration GUI is provided.

At step 684, the site administration GUI includes a camera management function which when executed, the camera management function displays a camera list from which a camera is selected, a set of camera details is shown for the selected camera, and a set of camera settings is made available for editing for the selected camera.

The camera list comprises the camera name, IP Address, camera manufacturer, username, password, camera model, GUID, and status of the camera. Right-selection of a camera row in the camera list provides access to the following camera controls: Edit: opens a dialog to edit the camera's general information, recording schedule, and camera settings; Change Credentials: opens a dialog to change the password of the corresponding camera; Add Camera: opens a dialog for adding a new camera; Enable Camera: enables an offline camera; Disable Camera: disables an online camera; Remove camera: deletes an online or offline camera from the camera list;

In the edit camera control, exemplary general Information which can be edited includes, but is not limited to: Name: This field is the name of the camera: Description: The description of the camera is in this field; IP Address: This field is for the IP address where the camera is configured; Brand: This field is for the brand name of the camera; Video Format: Select the video format from the dropdown; Model: This field is for the camera model: Username: Enter the user's name to view the camera's administration details; Password: Enter the user's password. Only the admin user can reset the password: Change Credentials: Use this option to change password information; CamGUID(mac ID): This field is for the unique camera ID; PTZ: Select the controls for PTZ-enabled cameras only: Audio: Select this option to enable audio; Apply: Click Apply to apply and save the changes; and Cancel: Click Cancel to disregard the changes and close the window.

In the edit camera control, an exemplary embodiment of the recording schedule dialog includes event based scheduling and time based scheduling. In event based scheduling, the recording starts when a selected event triggers. Events can be selected from the group of motion events, contact events, audio events and a combination thereof. Time based scheduling is specified as either continuous recording or on a custom schedule. When selecting a custom schedule for time based scheduling, a custom schedule is selected from previously defined list of schedules in a list or a new custom schedule is allowed to be created via a custom schedule dialog.

In the edit camera control, an exemplary embodiment of the Camera Settings dialog displays the details of a selected camera. Camera settings available for selecting include, but are not limited to, Video Format: displaying the video format of the video stream from the camera as MPEG, MJPEG, JPEG, or H264 dependent upon the camera and displaying a selector to choose the video format; Resolution: displaying the resolution of the video stream and selection via drop down selector; Quality: displaying the quality of the video and a selector to change the field; Frame Rate: displaying the Frame Rate of the video stream and a selector to change the field; Motion Settings: displaying a corresponding list of motion event settings and a selector to change each corresponding field in the list.

In the Add Camera control a new camera can be added to the camera list. In the preferred embodiment, the IP client application includes a user license that determines the number of cameras that he/she can add.

In the Enable Camera dialog, a confirmation selector is presented to confirm the enabling of a camera to be online. Similarly, in the disable camera dialog, a confirmation selector is presented to confirm the disabling of a camera to be offline. In the Remove Camera dialog, a confirmation selector is presented to remove the camera from the list of available cameras. Additionally, a second level confirmation selector is presented to ensure that a camera is not inadvertently removed from the camera list.

At step 686, the site administration application includes an NVR management function for managing network configuration, date and time, service status and maintenance of IP client software.

In the Network Configuration management function, an uplink configuration section displays the IP configuration of the NVR server and cameras attached thereto, the port configuration for video streaming (RTSP) and the domain name server configuration (DDNS). A DHCP functionality in the NVR server is available and manageable via the network configuration management function.

In the Date Time Settings configuration function the date, time, or time zone of the NVR server is set.

In the Service Status configuration function the status of all services running on the NVR server is displayed. A green status icon means the service is functioning properly. A red status icon means the service is not functioning properly.

In the maintenance configuration function the NVR server can be restarted and the NVR server software can be updated. In the preferred embodiment, updating of the NVR server software is accomplished by the IP client application downloading the software load from a central repository and uploading the software load to the NVR server via the maintenance configuration function.

The site administration application also includes a user management function to maintain a user list, user details, user permissions, and user email notification information. This feature also allows for adding users, editing users, and deleting users.

In managing users, permissions are assigned in the user management function including permissions for Live View of a particular set of cameras, Playback of a particular set of cameras, SMS text message, email capabilities. A user is assigned an administrator user type or a limited user type with usernames and passwords. Save changes after each user entry by clicking the Save button. An example of the screen is shown below.

At step 688, the site administration application includes a system preferences function wherein the IP client station is programmed with dialogs to adjust global recording settings, camera login information. SMTP details and a custom schedule for each camera in the network.

When an event, such as motion detection is triggered by a camera, the NVR server is programmed to record the video stream from the camera. In the system preferences function, a Global Recording dialog is programmed to accept settings for event pre-buffer time and event record duration for all cameras in the network.

In the Camera Default Login function, a dialog is available to maintain login information for sets of cameras. In the preferred embodiment, the camera login information includes a username and password for each camera manufacturer.

In the SMTP details function, a dialog is available to set simple mail transfer protocol configuration such as port number, IP address, email address and email format for an SMTP service running within NVR server.

At step 689, the site administration GUI includes an overall custom scheduler function wherein a set of custom recording schedules are created and maintained for the set of cameras attached to the NVR server. The custom scheduler application is also accessed by the edit camera control of the camera management function. When accessed through the edit camera control only the recording schedule for the associated camera is available for editing and only existing custom schedules can be chosen. In the overall custom scheduler function a dialog is available to create new schedules and edit existing schedules for the set of custom recording schedules, and to assign any schedule in the set of custom recording schedules to any of the set of cameras.

In the site administration GUI a System Info dialog displays the current NVR information including the name of the NVR, the NVR IP Address, Time Zone, and Camera License.

At step 690, the site administration GUI includes an log management application to manage NVR log files. In the preferred embodiment, step 690 selectively filters through NVR log files by one of the group of users and results. A subset of log files can be removed by a user. Filters can be set by a user.

Although enabling embodiment of the present disclosure has been described in detail, those skilled in the art should understand that various changes, substitutions and alterations may be made without departing from the spirit and scope of the present disclosure. For example, the choice of electronic components can be made in a variety of different ways and from a variety of manufacturers to accomplish the functionality. The dimensions of the housing may be changed and the number of Ethernet ports may be scaled as further examples. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. In a system comprising a network, a network video recorder connected to the network, a set of cameras connected to the network video recorder, and a server connected to the network, the network video recorder programmed to store and execute instructions that cause the system to automatically perform a method comprising the steps of:
   connecting each camera of the set of cameras to the network video recorder;
   powering each camera of the set of cameras;
   receiving a broadcast message from each camera of the set of cameras;
   automatically transmitting an IP address to each camera of the set of cameras;
   determining a set of video parameters based on the broadcast message for each camera of the set of cameras;
   sending the set of video parameters to each camera of the set of cameras;
   synchronizing a time among the set of cameras;
   automatically configuring an event delivery address for each camera of the set of cameras;
   automatically configuring a set of motion detection parameters for each camera of the set of cameras;
   wherein the broadcast message further comprises a set of connectivity data, and wherein the step of determining further comprising the steps of:
      automatically reporting the set of connectivity data from the broadcast message;
      automatically comparing the set of connectivity data with the set of video parameters;
      sending a request for the set of video parameters based on the set of connectivity data;
      receiving the set of video parameters in response to the request;
   receiving the broadcast messages from each camera by the network video recorder using a zero configuration networking protocol, the connectivity data in each broadcast message including a make, a model, a list of inherent capabilities, and a MAC address for a respective camera;
   providing the IP addresses of each camera by the network video recorder using a dynamic host configuration protocol service;
   including a video compression, a video frame rate, a video quality, a video resolution and a data transfer rate in the video parameters for the cameras;
   providing a network time protocol service by the network video recorder to synchronize a time of each camera;

setting up event delivery for each camera by communicating an IP address of the network video recorder to each camera as the event delivery address for camera events from each camera;

wherein the step of determining further comprising the steps of:

searching a SQL database for a match between the set of connectivity data and the set of video parameters;

when a match is not determined:

requesting a set of video parameters from the server by the network video recorder;

receiving the set of video parameters from the sever after the server searches for and retrieves the requested set of video parameters from a database of the server; and, saving the set of video parameters by the network video recorder prior to sending the set of video parameters to each camera.

2. The method of claim 1, further comprising the steps of:
establishing a video streaming session with each camera of the set of cameras;
configuring a media recorder for the video streaming session; and,
receiving a streamed video from each camera of the set of cameras through the video streaming session.

3. The method of claim 2, wherein the step of establishing a video streaming session further comprises the step of automatically configuring a real time streaming protocol video streaming session with each camera of the set of cameras.

4. The method of claim 1, further comprising the step of receiving a set of preferences for each camera of the set of cameras.

5. The method of claim 1, further comprising the step of automatically receiving a set of event data and a set of alarm data.

6. A security system comprising:
a first network;
a set of security devices connected to the first network;
a network video recorder further comprising a processor, a memory connected to the processor, a set of controllers connected to the processor, a set of communication ports connected to the set of controllers, and a power source connected to the set of communication ports, connected to the first network;
a power signal generated by the power source;
a discovery program saved in the memory and executed by the processor;
whereby the discovery program sends the power signal through each of the set of communication ports to each of the set of security devices and configures each of set of security devices;
the network video recorder programmed to automatically carry out the steps of:
determining a set of video parameters based on a broadcast message for each security device of the set of security devices;
sending the set of video parameters to each security device of the set of security devices;
wherein the broadcast message further comprises a set of connectivity data, and wherein the step of determining further comprising the steps of:
automatically reporting a set of connectivity data from the broadcast message;
automatically comparing the set of connectivity data with the set of video parameters;
sending a request for the set of video parameters based on the set of connectivity data;
receiving the set of video parameters in response to the request;
receiving the broadcast messages from each security device by the network video recorder using a zero configuration networking protocol, the connectivity data in each broadcast message including a make, a model, a list of inherent capabilities, and a MAC address for a respective security device;
providing the IP addresses of each security device by the network video recorder using a dynamic host configuration protocol service;
including a video compression, a video frame rate, a video quality, a video resolution and a data transfer rate in the video parameters for the set of security devices;
providing a network time protocol service by the network video recorder to synchronize a time of each security device;
setting up event delivery for each security device by communicating an IP address of the network video recorder to each security device as an event delivery address for security device events from each security device;
wherein the step of determining further comprising the steps of:
searching a SQL database for a match between the set of connectivity data and the set of video parameters;
when a match is not determined:
requesting the set of video parameters from a server connected to a second network by the network video recorder;
receiving the set of video parameters from the sever after the server searches for and retrieves the requested set of video parameters from a database of the server; and,
saving the set of video parameters by the network video recorder prior to sending the set of video parameters to each security device.

7. The security system of claim 6, wherein each communication port of the set of communication ports is an Ethernet port.

8. The security system of claim 6, wherein the set of controllers further comprises an Ethernet switch.

9. The security system of claim 6, wherein the power signal is a power over Ethernet signal.

10. The security system of claim 6, wherein the set of controllers further comprises a set of Ethernet controllers.

11. The security system of claim 6, further comprising;
a second network connected to the network video recorder; and,
an IP client station connected to the second network.

12. The security system of claim 11, further comprising an update server connected to the second network.

13. The security system of claim 6, further comprising a set of I/O contact closures connected to the set of security devices.

14. The security system of claim 6, wherein the network video recorder further comprises a media recorder program saved in the memory and executed by the processor and connected to the first network to record a video stream.

15. A security system comprising:
a first network;
a set of security devices connected to the first network;

a network video recorder further comprising a processor, a memory connected to the processor, a set of controllers connected to the processor, a set of communication ports connected to the set of controllers, and a power source connected to the set of communication ports, connected to the first network;

a power signal generated by the power source;

the network video recorder programmed to automatically carry out the steps of:
- connecting each security device of the set of security devices to the network video recorder;
- sending the power signal to each security device of the set of security devices;
- receiving a broadcast message from each security device of the set of security devices;
- automatically transmitting an IP address to each security device of the set of security devices;
- determining a set of video parameters based on the broadcast message for each security device of the set of security devices;
- sending the set of video parameters to each security device of the set of security devices;
- synchronizing a time among the set of security devices;
- automatically configuring an event delivery address for each security device of the set of security devices;
- automatically configuring a set of motion detection parameters for each security device of the set of security devices;
- wherein the broadcast message further comprises a set of connectivity data, and wherein the step of determining further comprising the steps of:
  - automatically reporting a set of connectivity data from the broadcast message;
  - automatically comparing the set of connectivity data with the set of video parameters;
  - sending a request for the set of video parameters based on the set of connectivity data;
  - receiving the set of video parameters in response to the request;
  - receiving the broadcast messages from each security device by the network video recorder using a zero configuration networking protocol, the connectivity data in each broadcast message including a make, a model, a list of inherent capabilities, and a MAC address for a respective security device;
- providing the IP addresses of each security device by the network video recorder using a dynamic host configuration protocol service;
- including a video compression, a video frame rate, a video quality, a video resolution and a data transfer rate in the video parameters for the set of security devices;
- providing a network time protocol service by the network video recorder to synchronize a time of each security device;
- setting up event delivery for each security device by communicating an IP address of the network video recorder to each security device as an event delivery address for security device events from each security device;
- wherein the step of determining further comprising the steps of:
  - searching a SQL database for a match between the set of connectivity data and the set of video parameters;
  - when a match is not determined:
    - requesting the set of video parameters from a server connected to a second network by the network video recorder;
    - receiving the set of video parameters from the server after the server searches for and retrieves the requested set of video parameters from a database of the server; and,
    - saving the set of video parameters by the network video recorder prior to sending the set of video parameters to each security device.

16. The security system of claim 15, wherein the network video recorder is further programmed to carry out the steps of:
- establishing a video streaming session with each security device of the set of security devices; and,
- receiving a streamed video from each security device of the set of security devices through the video streaming session.

* * * * *